(12) United States Patent
Saito et al.

(10) Patent No.: US 6,222,298 B1
(45) Date of Patent: Apr. 24, 2001

(54) CARBON COMMUTATOR AND METHOD FOR PRODUCING THE SAME

(75) Inventors: Junichi Saito; Shunji Kumagai, both of Kiryu (JP)

(73) Assignee: Mitsuba Corporation, Gunma-Ken (JP)

( * ) Notice: Subject to any disclaimer, the term of this patent is extended or adjusted under 35 U.S.C. 154(b) by 0 days.

(21) Appl. No.: 09/485,183

(22) PCT Filed: Jul. 22, 1998

(86) PCT No.: PCT/JP98/03284

§ 371 Date: Feb. 3, 2000

§ 102(e) Date: Feb. 3, 2000

(87) PCT Pub. No.: WO99/08367

PCT Pub. Date: Feb. 18, 1999

(30) Foreign Application Priority Data

| Jun. 8, 1997 | (JP) | 9-212328 |
| Jul. 10, 1997 | (JP) | 9-274862 |
| Aug. 9, 1997 | (JP) | 8-243159 |

(51) Int. Cl.[7] .......................... H02K 13/00; H01K 39/06
(52) U.S. Cl. .......................... 310/233; 310/44; 310/235; 310/236; 310/237; 29/597
(58) Field of Search .................. 310/237, 236, 310/233, 235, 44; 29/597

(56) References Cited

U.S. PATENT DOCUMENTS

| 3,601,645 | 8/1971 | Whiteheart | 310/249 |
| 4,366,361 | 12/1982 | Allen | 219/78.01 |
| 5,157,299 | * 10/1992 | Gerlach | 310/237 |
| 5,175,463 | 12/1992 | Farago et al. | 310/237 |
| 5,255,426 | 10/1993 | Farago et al. | 29/597 |
| 5,400,496 | * 3/1995 | Kemmner et al. | 310/237 |
| 5,629,576 | * 5/1997 | Shimoyama | 310/237 |
| 5,925,961 | * 7/1999 | Sugiyanma | 310/237 |
| 5,925,962 | * 7/1999 | Kobman et al. | 310/237 |

FOREIGN PATENT DOCUMENTS

| dex | 12/1989 | (DE) | H01R/39/06 |
| 2009196 | 1/1970 | (FR) | H01R/39/00 |
| 2347800 | 11/1977 | (FR) | H01R/43/12 |
| 52-124107 | 10/1977 | (JP) . | |
| 53-11641 | 4/1978 | (JP) | H01R/39/18 |
| 8126258 | 5/1996 | (JP) | H02K/13/00 |
| 8308183 | 11/1996 | (JP) | H02K/13/00 |
| 9046978 | 2/1997 | (JP) | H02K/13/00 |
| 9-111372 | 4/1997 | (JP) | H01R/39/04 |
| 10174375 | 6/1998 | (JP) | H02K/13/00 |
| WO 97/03486 | 1/1997 | (WO) | H01R/43/06 |

* cited by examiner

*Primary Examiner*—Burton Mullins
(74) *Attorney, Agent, or Firm*—Darby & Darby

(57) ABSTRACT

The carbon commutator of the present invention comprises a plurality of segments having ends which are sliding members on a brush and the other ends to which conductive terminal members are attached, wherein the segments are arranged in a circumferential direction on an insulating boss member and are insulated from each other, carbon layers being formed on the sliding member sides of the segments, metal layers being formed between the carbon layers and the conductive terminal members by sintering a first material of a principal component of the conductive terminal member with a second material which can alloy with the first material.

24 Claims, 19 Drawing Sheets

○ CARBON POWDER
⦸ TIN POWDER
⊚ COPPER POWDER

○ CARBON
⦸ COPPER TIN ALLOY (BRONZE)

CARBON COMMUTATOR AND METHOD FOR PRODUCING THE SAME

TECHNICAL FIELD

The present invention relates to a commutator in a motor, and more particularly to a carbon commutator in which a member for sliding on a motor brush contains carbon.

BACKGROUND ART

In fuel feed pumps in automobiles, there has been known a so-called in-tank-type system having a motor and a pump integrated in a fuel tank, in which a commutator of the motor directly contacts the fuel because the fuel in the tank is fed through a motor housing to outside devices. In automobiles using gasoline including alcohol, the problem arises that copper in the sliding member of the commutator, which contacts with the brush, is eroded by the alcohol in the gasoline. To avoid this, Japanese Patent Application, First Publication No. Hei 8-308183 discloses a carbon commutator which contains carbon in the member for sliding on the brush.

In the carbon commutator described in the publication, a plurality of segments (commutator pieces), which are produced by compacting and sintering a carbon powder, are arranged to be insulated from each other in a circumferential direction on an insulating boss member made of a synthetic resin. Copper riser pieces which are conductive terminal members are integrally sintered together with the segments. This publication discloses that, in order to ensure electrical connection between the conductive terminal members and the segments, conductive metal powder may be compacted and sintered around the conductive terminal members, or a mixture of the metal powder and the carbon powder is stratified and sintered so that the ratio of the carbon powder may be increased from the conductive terminal members toward the sliding member for the brush. In order for the coefficient of thermal expansion to approximate that of the riser pieces, the same copper material as the riser pieces or nickel-plated copper powder is selected for the metal powder.

However, the above copper powder and the nickel-plated copper powder are not integrated with the riser piece during sintering in a range of 700° C. to 900° C., which is the sintering temperature range for the carbon powder. The riser pieces merely come in contact with the copper powder in the sintered segments, which may therefore become unstable. It is known that the green compact of the metal powder contracts during the sintering, so even when the same copper material as the riser pieces is selected as the metal powder to approximate the coefficient of thermal expansion, the problem arises that gaps may be occur between the sintered compact of the copper powder and the riser pieces.

When the carbon powder and the copper powder are stratified and sintered, binder added to the carbon powder is thermally decomposed and carbonized so that in the carbon powder portion the contraction ratio is greater than the expansion ratio. The contraction ratio of the copper powder is less than the contraction ratio of the carbon powder portion, while the thermal expansion in the copper powder during the sintering is greater than that in the carbon powder. Therefore, slippage may occur at the boundary between the carbon powder and the copper powder, so the sintered segments are apt to separate at the boundaries. It is impossible in the conventional carbon commutator to achieve a long-term stable electrical and mechanical connection especially in fuel which contains alcohol as mentioned above.

It is therefore an object of the present invention to provide a carbon commutator which contains carbon in the sliding members and which achieve long-term stable electrical and mechanical connection between the segments and the conductive terminal members.

DISCLOSURE OF INVENTION

In order to solve the problem, a carbon commutator according to the present invention comprises a plurality of segments having ends which are sliding members on a brush and the other ends to which conductive terminal members are attached, wherein the segments are arranged in a circumferential direction on an insulating boss member and are insulated from each other, carbon layers being formed on the sliding member sides of the segments, metal layers being formed between the carbon layers and the conductive terminal members by sintering a first material of a principal component of the conductive terminal member with a second material which can alloy with the first material. Zinc, antimony, or lead may be substituted for tin which is the second material in the metal layer. The carbon commutator is produced by filling a space around the conductive terminal members with a metal powder to form the metal layer, filling the space on the side of the sliding members with a carbon powder, and then compacting and sintering the powders. During the sintering, the tin powder which has a low melting point of 232° C. melts such that copper particles and the conductive terminal members become wet with tin, thereby liquid phase sintering occurs.

During the liquid phase sintering, the copper melts into the liquid phase of the molten tin, and the amount of the liquid phase increased so as to increase the ratio of the copper content until it is saturated with the solid phase component, while the tin has been diffused in the copper solid phase. The particles are rearranged so as to relax compressive stress arising from thermal expansion of the conductive terminal members. The small copper particles preferentially melt in the liquid phase and are deposited on the large copper particles as a solid phase. The grain growth is promoted during the dissolution and deposition process, so that the copper component in the metal layer alloys with the tin component (production of bronze) to integrate the conductive terminal members with the carbon layers, relaxing the compressive stress. Thus, the segments and the conductive terminal members are reliably integrated electrically and mechanically. By sintering in which the tin component in the metal layer forms the liquid phase, even when gaps and slippage occur between the conductive terminal member and the carbon layer because of the difference in ratio of the contraction and the thermal expansion, the gap is filled with the liquid phase and the compressive stress is relaxed, thus preventing separation between the metal layer, the conductive terminal member, and the carbon layer and ensuring reliable bonding therebetween. When the metal layer is arranged only on the side of the carbon layer with respect to the conductive terminal member, the sufficient electrical and mechanical bonding can be achieved.

When the ratio of the tin component to the copper component in the metal layer is too high, an undesirable brittle phase of the intermetallic compound may form during the sintering, and depending on the sintering temperature the concentration of tin component may exceed the upper limit of the concentration of tin in a stable a solid solution in the copper tin alloy series. On the other hand, when the tin component ratio is too low, the molten tin alloys preferentially with the copper powder particles which have small diameters. This reduces the ratio of alloy with the conductive terminal member and inhibits the relaxation of the compressive stress against the carbon layer, so that sufficient bonding between the metal layer, the conductive terminal layer, and the carbon layer is not achieved. To avoid this, a weight ratio of the copper to the tin in the metal layer is in a range from 98.0:2.0 to 86.5:13.5, and more preferably in a range from 95.0:5.0 to 90.0:10.0.

To produce the segments, the carbon powder forming the carbon layer and the mixed powder of copper and tin are pressed and sintered as mentioned above. When the sintering temperature is too low, the above mentioned effect is not obtained, making the bonding of the segments with the conductive terminal members unstable. When the sintering temperature is too high, the liquid phase may increase so that the shape of the compact cannot be maintained, and may flow out along the conductive terminal member depending on the circumstances. To solve the problem, the sintering temperature is preferably set in a range of 800° C. to 850° C. in the method for producing the carbon commutator of the present invention.

In the method for producing the carbon commutator, by compacting the carbon powder forming the carbon layer and the mixed powder comprising the copper and tin which form the metal layer, and by sintering the resulting green compact, the liquid phase arising from the sintering of the mixed powder comprising the copper and the tin permeates into the grain boundary of the carbon powder, producing an anchoring effect and securing the bonding of the carbon layer to the metal layer. When forming the green compact, one of the carbon powder forming the carbon layer and the mixed powder comprising the copper and tin which form the metal layer is fed into the green compact mold and compressed, and the other one of the carbon powder and the mixed powder comprising the copper and tin is thereafter fed in and compressed. This regulates the thickness of the carbon layer in the sintered segment, and prevents shortening of the life of the carbon commutator due to exposure of the metal layer.

The carbon commutator according to the present invention comprises a plurality of segments having ends which are sliding members on a brush and the other ends to which conductive terminal members are attached, wherein the segments are arranged in a circumferential direction on an insulating boss member and are insulated from each other, carbon layers being formed on the sliding member sides of the segments, metal layers being formed between the carbon layers and the conductive terminal members by sintering carbon, a first material of a principal component of the conductive terminal member, and a second material which can alloy with the first material. The metal layers are formed by sintering carbon, the first material of a principal component of the conductive terminal member, and the second material have a melting point lower than that of the first material, for example, carbon, copper, and tin. Zinc, antimony, or lead may be substituted for the tin in the metal layer. The carbon commutator is produced by filling a space around the conductive terminal members with a mixed powder comprising carbon, copper, and tin to form the metal layer, filling a space on the side of the sliding members with a carbon powder, and compacting and sintering the powders. During the sintering, the tin powder which has a low melting point of 232° C. melts such that copper particles and the conductive terminal members become wet, thereby liquid phase sintering occurs.

During the liquid phase sintering, the copper melts into the liquid phase of the molten tin, and the amount of the liquid phase has increased so as to increase the ratio of the copper content until it is saturated with the solid phase component, while the tin has been diffused in the copper solid phase. The particles are rearranged so as to relax compressive stress arising from thermal expansion of the conductive terminal members. The small copper particles preferentially melt in the liquid phase and are deposited on the large copper particles as a solid phase. The grain growth is promoted during the dissolution and deposition process, so that the copper component in the metal layer alloys with the tin component (production of bronze) to integrate the conductive terminal members with the carbon layers, relaxing the compressive stress. Thus, the segments and the conductive terminal members are reliably integrated electrically and mechanically. By sintering in which the tin component in the metal layer forms the liquid phase, even when gaps and slippage occur between the conductive terminal member and the carbon layer because of the difference in ratio of the contraction and the thermal expansion, the gap is filled with the liquid phase, the compressive stress is relaxed, and the liquid phase permeates into boundaries, causing an anchoring effect, which prevents separation between the metal layer, the conductive terminal member, and the carbon layer and ensures reliable bonding therebetween.

According to the carbon commutator of the present invention, the metal layers contain the carbon in addition to the copper and the tin causing the liquid phase sintering. The anchoring effect can be accomplished because the carbon in the metal layers and the carbon in the carbon layers are bound during the sintering. This improves the strength at the boundaries between the metal layers and the carbon layers with the anchoring effect by the liquid phase. The carbon contained in the metal layers relaxes the thermal compressive stress, thereby preventing the metal layers from becoming separated. The metal layer contains the carbon which is comparatively soft, compared with a metal layer essentially consisting of the copper tin alloy, and this prevents the metal layer from becoming too hard and workability of the segment from being reduced. Because the carbon does not soften and melt, even when the liquid phase develops due to the copper and the tin during the sintering, the carbon in the metal layer works as aggregate to stabilize the shape of the sintered body. While in the conventional carbon commutator the copper powder is fed around the conductive terminal member, when the metal layer is arranged only on the side of the carbon layer with respect to the conductive terminal member, the sufficient electrical and mechanical bonding can be achieved.

When the percentage content of the carbon in the metal layer is too low, the metal layer becomes too hard so that damage during the processing of the segment cannot be prevented. Further, the anchoring effect and the relaxation of the thermal compressive stress against the carbon layer according to the carbon in the metal layer, and the stabilization of the shape of the sintered body cannot be achieved. Since the carbon does not react to the copper in the riser piece, when the percentage content of the carbon in the metal layer is too high, the bonding of the riser piece to the metal layer becomes insufficient, and thereby they easily become separated. The percentage content by weight of the carbon in the metal layer is in a range of 2 to 25 wt %, more preferably in a range of 10 to 20 wt %.

When the ratio of the tin component to the copper component In the metal layer is too high, an undesirable brittle phase of the intermetallic compound may form during the sintering, and depending on the sintering temperature the concentration of tin component may exceed the upper limit of the concentration of tin in a stable a solid solution in the copper tin alloy series. On the other hand, when the tin component ratio is too low, the molten tin alloys preferentially with the copper powder particles which have small diameters. This reduces the ratio of alloy with the conductive terminal member and inhibits the relaxation of the compressive stress against the carbon layer, so that sufficient bonding between the metal layer, the conductive terminal member, and the carbon layer is not achieved. To avoid this, the weight ratio of the copper to the tin in the metal layer is in a range from 98.0:2.0 to 86.5:13.5, and more preferably in a range from 95.0:5.0 to 90.0:10.0.

To produce the segments, the carbon powder forming the carbon layer and the mixed powder of carbon, copper, and tin are pressed and sintered. When the sintering temperature is too low, the above mentioned effect is not obtained, making the bonding of the segments with the conductive terminal members unstable. When the sintering temperature is too high, the liquid phase may increase so that the shape of the compact cannot be maintained irrespective of the carbon contained in the metal layer, and may flow out along the conductive terminal member depending on the circumstances. To solve the problem, the sintering temperature is preferably set in a range of 800° C. to 850° C. in the method for producing the carbon commutator of the present invention. When forming the green compact, one of the carbon powder forming the carbon layer and the mixed powder comprising the carbon, copper, and tin which form the metal layer is fed into the green compact mold and compressed, and the other one of the carbon powder and the mixed powder comprising the carbon, copper, and tin is thereafter fed in and compressed. This regulates the thickness of the carbon layer in the sintered segment, and prevents shortening of the life of the carbon commutator due to exposure of the metal layer.

The carbon commutator according to the present invention comprises a plurality of segments having ends which are sliding members on a brush and the other ends to which conductive terminal members are attached, wherein the segments are arranged in a circumferential direction on an insulating boss member and are insulated from each other, carbon layers being formed on the sliding member sides of the segments, metal layers being formed between the carbon layers and the conductive terminal members by sintering a first material of a principal component of the conductive terminal member with a second material which can alloy with the first material, intermediate layers being formed between the metal layers and the carbon layers, the intermediate layers comprising carbon and the first material of the principal component of the conductive terminal member. The metal layers are formed by sintering carbon, the first material of a principal component of the conductive terminal member, and the second material have a melting point lower than that of the first material, for example, carbon, copper, and tin. Zinc, antimony, or lead may be substituted for the tin in the metal layer. The carbon commutator is produced by filling a space around the conductive terminal members with a metal powder to form the metal layer, filling a space on the side of the sliding members with, filling a space between them with a mixed powder comprising carbon and copper, and compacting and sintering them. During the sintering, the tin powder which has a low melting point of 232° C. melts such that copper particles and the conductive terminal members become wet, thereby liquid phase sintering occurs.

During the liquid phase sintering, the copper melts into the liquid phase of the molten tin, and the amount of the liquid phase has increased so as to increase the ratio of the copper content until it is saturated with the solid phase component, while the tin has been diffused in the copper solid phase. The particles are rearranged so as to relax compressive stress arising from thermal expansion of the conductive terminal members. The small copper particles preferentially melt in the liquid phase and are deposited on the large copper particles as a solid phase. The grain growth is promoted during the dissolution and deposition process, so that the copper component in the metal layer alloys with the tin component (production of bronze) to integrate the conductive terminal members with the carbon layers, relaxing the compressive stress. Thus, the segments and the conductive terminal members are reliably integrated electrically and mechanically. By sintering in which the tin component in the metal layer forms the liquid phase, even when gaps and slippage occur between the conductive terminal member and the carbon layer because of the difference in ratio of the contraction and the thermal expansion, the gap is filled with the liquid phase and the compressive stress is relaxed, thus preventing separation between the metal layer, the conductive terminal member, and the carbon layer and ensuring reliable bonding therebetween. When the metal layer is arranged only on the side of the carbon layer with respect to the conductive terminal member, the sufficient electrical and mechanical bonding can be achieved.

The intermediate layer comprising carbon and copper is formed between the metal layer and the carbon layer. During the sintering, the liquid phase arising in the metal layer is diffused into the intermediate layer, alloying with the copper in the intermediate layer, so that the metal layer and the intermediate layer are bound, while the carbon in the intermediate layer is bound with the carbon in the carbon layer, thus integrating the carbon layer with the intermediate layer. As a result, the carbon layer and the metal layer are integrated through the intermediate layer, and the segment and the conductive terminal member are electrically and mechanically combined. As compared with a case in which a carbon layer is directly layered on the metal layer comprising copper and tin, compressive stress can be relaxed, and even when the sintering temperature is comparatively high, separation between the layers can be prevented.

Regarding the ratio of the carbon to the copper in the intermediate layer, when the percentage content of the carbon in the intermediate layer is too low, the carbon layer and the intermediate layer separate easily. When the percentage content of the carbon in the intermediate layer is too high and the percentage content of the copper is low, the difference between the intermediate layer and the carbon layer may disappear, and this makes the metal layer and the intermediate layer separate easily. Therefore, the percentage content by weight of the carbon in the intermediate layer may preferably be in a range of 10 to 40 wt %. The percentage content of the carbon in the intermediate layer may be gradually or continuously increased from the metal layer toward the carbon layer, providing gradual distribution in the intermediate layer, and this improves the bonding between the carbon layer, the metal layer, and the intermediate layer.

When the ratio of the tin component to the copper component in the metal layer is too high, an undesirable brittle phase of the intermetallic compound may form during the sintering, and depending on the sintering temperature the concentration of tin component may exceed the upper limit of the concentration of tin in a stable a solid solution in the copper tin alloy series. On the other hand, when the tin component ratio is too low, the molten tin alloys preferentially with the copper powder particles which have small diameters. This reduces the ratio of alloy with the conductive terminal member and inhibits the relaxation of the compressive stress against the carbon layer, so that sufficient bonding between the metal layer, the conductive terminal member, and the carbon layer is not achieved. To avoid this, the weight ratio of the copper to the tin in the metal layer is in a range from 98.0:2.0 to 86.5:13.5, and more preferably in a range from 95.0:5.0 to 90.0:10.0.

To produce the segments, the carbon powder forming the carbon layer, the mixed powder forming the intermediate layer comprising the carbon and the copper, and the mixed powder forming the metal layer comprising the copper and the tin are pressed to produce a green compact, and subsequently the green compact is sintered. When the sintering temperature is too low, the above mentioned effect is not obtained, making the bonding of the segments with the conductive terminal members unstable. When the sintering temperature is too high, the liquid phase may increase so that the shape of the compact cannot be maintained. To solve the problem, the sintering temperature is preferably set in a range of 800° C. to 850° C. in the method for producing the carbon commutator of the present invention. Herein, because the intermediate layerrelaxes the thermal compressive stress when the sintering temperature is high, the stable bonding can be achieved even when the sintering temperature is increased to 900° C. on condition that the shape of the sintered body can be maintained.

When forming the green compact, one of the carbon powder forming the carbon layer and the mixed powder comprising the copper and tin which form the metal layer is fed into the green compact mold and compressed, the mixed powder comprising the carbon and the copper is fed in to form the intermediate layer, and the other one of the carbon powder and the mixed powder comprising the copper and tin is thereafter fed in and compressed. This regulates the thickness of the carbon layer in the sintered segment, and prevents shortening of the life of the carbon commutator due to exposure of the metal layer.

BRIEF DESCRIPTION OF DRAWINGS

FIG. 4(a) shows a situation in which the green compact mold 25 is separated, FIG. 4(b) shows a situation in which a carbon powder layer 26 and a metal powder layer 27 are formed, and FIG. 4(c) shows a situation in which the powders are compressed by pressure hardening templates 28A and 28B.

FIG. 13(a) shows a situation in which the green compact mold 125 is separated, FIG. 13(b) shows a situation in which a carbon powder layer 126 and a mixed powder layer 127 are formed, and FIG. 13(c) shows a situation in which the powders are compressed by pressure hardening templates 128A and 128B.

FIG. 23(a) shows a situation in which the green compact mold 225 is separated, FIG. 23(b) shows a situation in which a carbon powder layer 226 and mixed powder layers 227 and 228 are formed, and FIG. 23(c) shows a situation in which the powders are compressed by pressure hardening templates 229A and 229B.

DESCRIPTION OF THE PREFERRED EMBODIMENTS

First Embodiment

Figure 1:
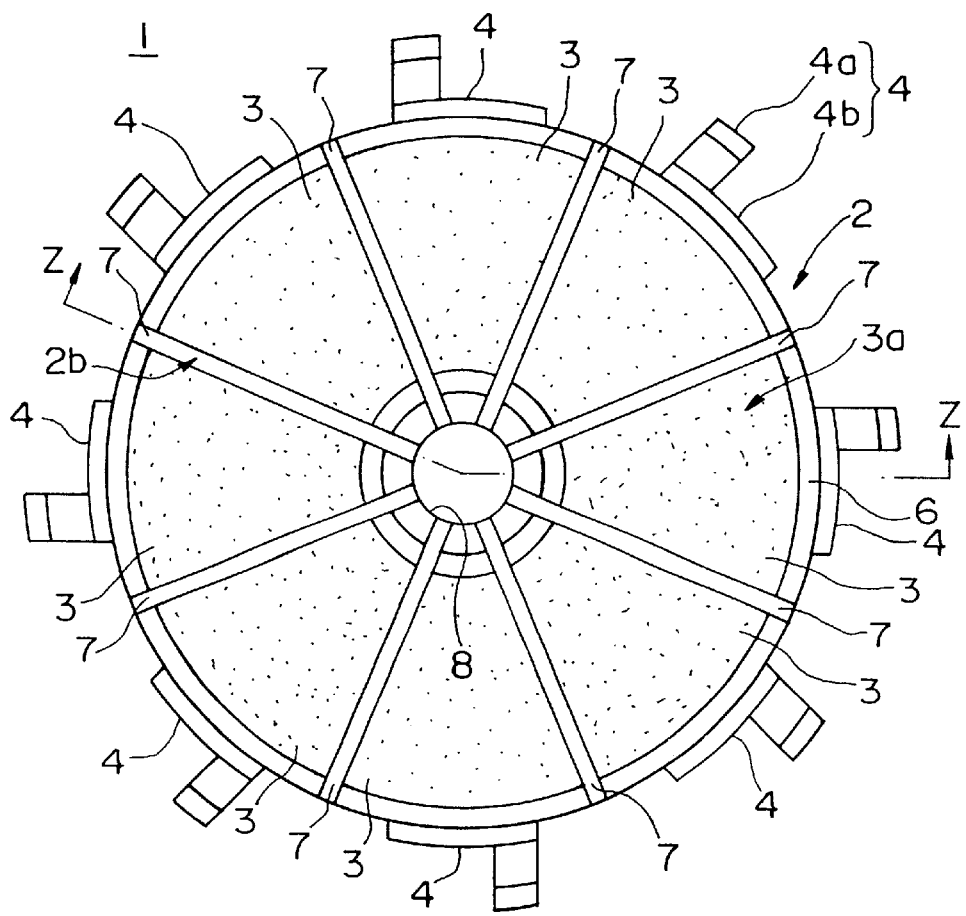
FIG. 1 is a top view showing a side of top surfaces 3a of segments 3 of carbon commutator 1 according to an embodiment of the present invention.
Figure 2:
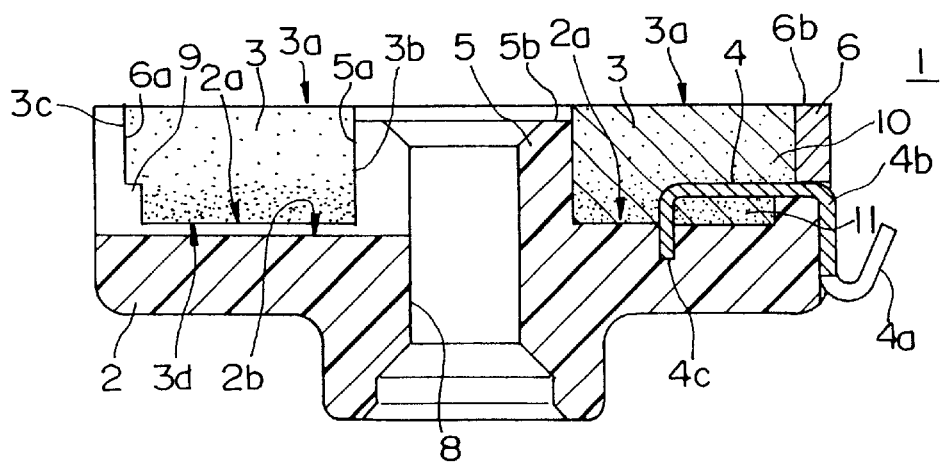
FIG. 2 is a cross-sectional view from line Z—Z of FIG. 1.

FIGS. 1 and 2 show one embodiment of a carbon commutator according to the present invention. The carbon commutator 1 of the invention, which is applied to, for example, a motor in an in-tank type fuel feed pump, is flattened, and comprises a nearly disc-shaped boss member 2 made of insulating resin, and a plurality of segments 3 (eight segments in this embodiment) which are located at regular intervals in a circumferential di rection, forming an annular shape on a circular top surface 2a of the boss member 2. Top surfaces 3a of the segments 3 are sliding members in contact with a brush of a motor. Further, each segment 3 has a riser piece 4 which is a conductive terminal member, and one end 4a of the riser piece 4 projects outward from the boss member 2.

On the top surface 2a of the boss member 2, a cylindrical inside wall 5 is built at the center and a cylindrical outside wall 6 is built at the periphery, while the top surfaces 3a of the segments 3 are shaped into sectorial blocks as shown in FIG. 1. The segments 3 are located radially between the inside wall 5 and the outside wall 6, and are arranged in a circumferential direction on the boss member 2 as described above. Between the neighboring segments 3, slits 7 extend in radial directions on the boss member 2 to form grooves 2b indented by one step from the top surface 2a through the inside wall 5 and the outside wall 6, insulating the neighboring segments 3 from each other. An axis hole 8 in the inside wall 5 reaches the other surface of the boss member 2, and is used to mount the carbon commutator 1 to the rotation axis of the motor.

As shown in FIG. 2, a circumferential outside surface 5a of the inside wall 5 of the boss member 2 contacts with concave arc surfaces 3b at inner sides of the segments 3, while inside surface 6a of the outside wall 6 contacts with convex arc surfaces 3c at the outer sides of the segments 3. A top surface 5b of the inside wall 5 is lower than the top surfaces 3a of the segments 3, while the top surface 6b of the outside wall 6 corresponds to the top surfaces 3a. A step 9 is shaped on corners between the top surface 2a of the boss member 2 and an inside surface 6a of the outside wall 6.

The riser pieces 4, which are conductive terminal members in this embodiment, are formed into plate-shapes of copper or copper alloy, and are embedded above rear surfaces 3d of the segments 3 raised slightly towards the top surfaces 3a, as shown in FIG. 2. The riser pieces 4 extend outward in the radial direction of the boss member 2 from nearly the middle of the segment 3 through the outside wall 6, are bent at the rear portion to form L-shapes, and extend via wide portions 4b along the outside circumference of the outside wall 6 to ends 4a. The ends 4a are formed into V-shapes by bending projections, which extend outward, toward the front side. The other ends 4c of the riser pieces 4 project from the rear surfaces 3d of the segments 3 and are embedded vertically in top surface 2a of the boss member 2.

In the embodiment of the carbon commutator 1, portions including the top surfaces 3a, which are sliding members of the segments 3, are carbon layers 10 in which carbon and appropriate binder are mixed. Portions including the rear surfaces 3d around the riser pieces 4 are metal layers 11 of copper and material which can alloy with the riser pieces 4 of the conductive terminal member and have a melting point lower than that of the riser pieces 4, for example, tin. In the metal layers 11, an alloy of copper and tin, that is bronze, is deposited due to liquid phase sintering of copper and tin, and this alloy affects the riser pieces 4 of copper or copper alloy, thus integrating the riser pieces 4 with the carbon layers 10 and the metal layers 11, that is, the segments 3. The weight ratio of copper to tin in the metal layers 11 is in a range from 98.0:2.0 to 86.5:13.5, and preferably in a range of 95.0:5.0 to 90.0:10.0, and in this embodiment, it is set to 90.0:10.0. The metal layers 11 have a thickness of approximately ½ of that of the segments 3. In addition, at least one material selected from the a group of zinc, antimony, and lead may be substituted for all or a part of the tin in the metal layer 11.

Figure 3A:
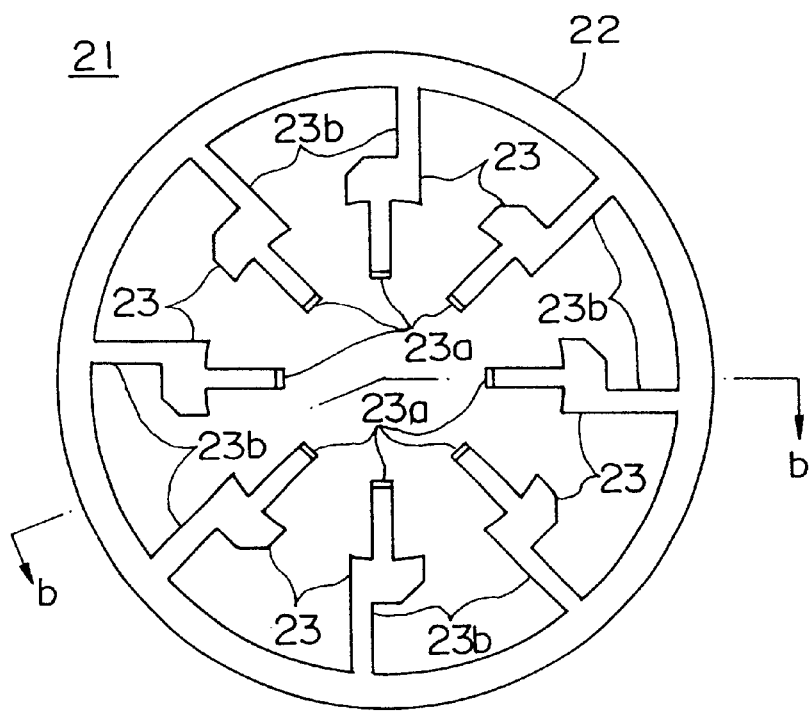
FIG. 3(a) is a top view showing a riser piece element plate 21 obtained by a method for producing the carbon commutator 1 according to the embodiment of the present invention.
Figure 3B:
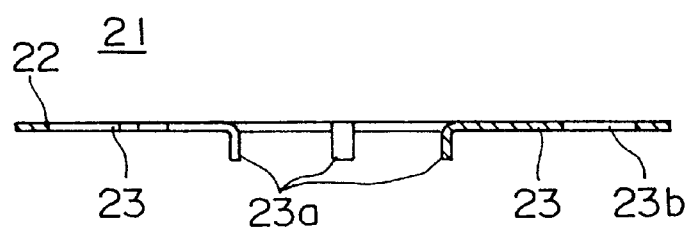
FIG. 3(b) is a cross-sectional view from line b—b of FIG. 3(a).

Referring to FIGS. 3 to 7, a method for producing the carbon commutator 1 described above according to the embodiment of the present invention will be explained. Before manufacturing the carbon commutator 1, a riser piece element plate 21, which is a prototype of the riser pieces 4 to be integrated with the segments 3 shown in FIG. 3, is prepared. The riser piece element plate 21 of circular outline is a copper plate or a copper alloy plate, and in this embodiment, is manufactured by pressing of an oxygen-free copper plate of 0.6 mm in thickness. The riser piece element plate 21 have an annular ring-shaped member 22 with an inner diameter greater than an outside diameter of the produced carbon commutator 1, and riser piece elements 23 of the same number of the riser pieces 4 are integrally formed at the inner rim of the ring-shaped member 22. The riser piece element plate 21 have the shape of unbent riser pieces 4 excluding the inner ends 23a as the above described other ends 4c of the riser pieces 4 which are bent beforehand, and extend in radial directions in a fashion similar to the riser pieces 4 in the segments 3 located in the circumferential direction in the finished carbon commutator 1. Outer ends 23b corresponding to the ends 4a of the riser pieces 4 are integrally connected to the ring-shaped member 22.

Figure 4A:
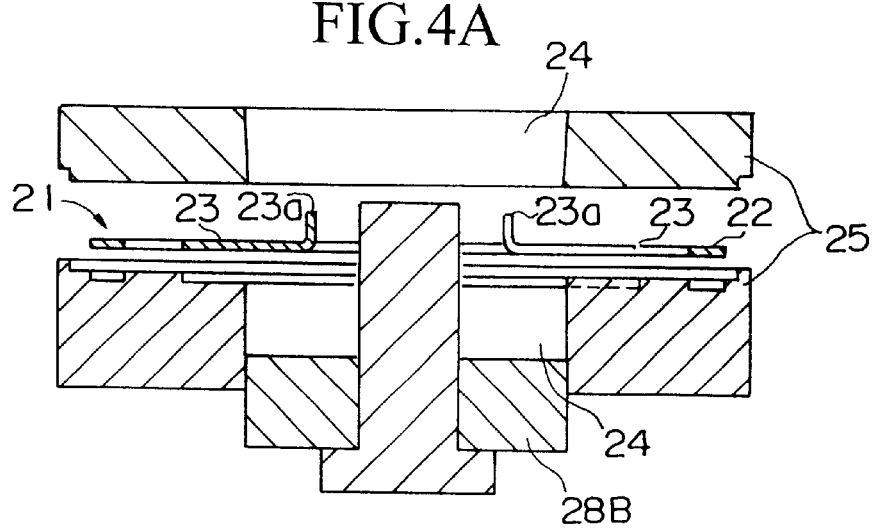
FIGS. 4(a) to 4(c) are cross-sectional views of a green compact mold 25 used in the method for producing the carbon commutator 1 according to the embodiment of the present invention.
Figure 4B:
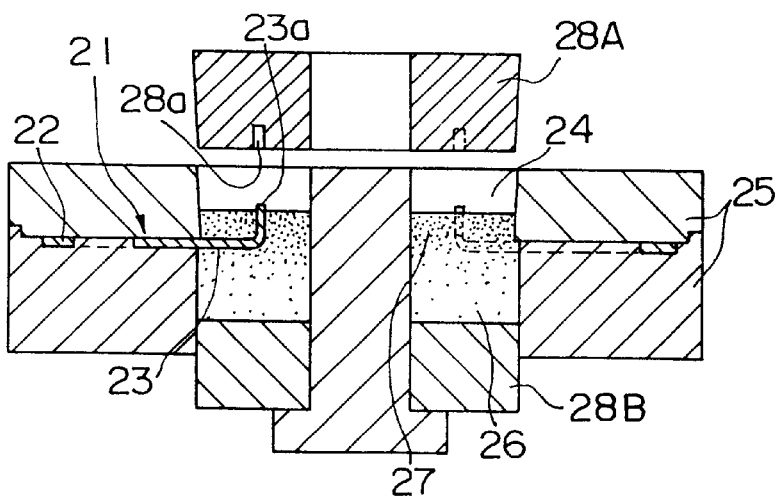

As shown in FIG. 4(a), the riser piece element plate 21 is placed on a green compact mold 25 with an annular cavity 24 whose dimensions are set in view of contraction in size in sintering with respect to the dimensions of the segments 3. The riser piece element plate 21 is placed such that the axes of the riser piece element plate 21 and the cavity 24 are aligned. As shown in FIG. 4(b), a mixed powder comprising the carbon powder and the binder is fed into the cavity 24 to form a carbon powder layer 26 on a side corresponding to the top surfaces 3a of the segments 3 (the bottom of the cavity 24). Subsequently, a mixed powder comprising copper and tin is fed in to form a metal powder layer 27 in a side corresponding to the rear surfaces 3d around the riser piece elements 23 of the riser piece element plate 21. Preferably, when filling the cavity 24 with the carbon powder layer 26 and the metal powder layer 27, the carbon powder layer 26 is formed by filling the bottom side of the cavity 24 with the mixed powder comprising the carbon powder and the binder, subsequently the carbon powder layer 26 is made uniform in thickness by slightly pressing the carbon powder layer 26 using a temporary press template, and subsequently the metal powder layer 27 is formed by feeding the mixed powder of copper and tin on the carbon powder layer 26.

In the embodiment, the mixed powder of the carbon powder layer 26 is produced by mixing the mixed carbon powder comprising natural and artificial graphite with a phenol binder, subsequently kneading, drying, grinding, and grading the powder by size, and regulating the grain size to less than 500 µm. The mixed powder of the metal powder layer 27 is produced by blending an electrolytic copper powder with a pulverized tin powder at a predetermined weight ratio and mixing the powders using a V-type mixer.

Figure 4C:
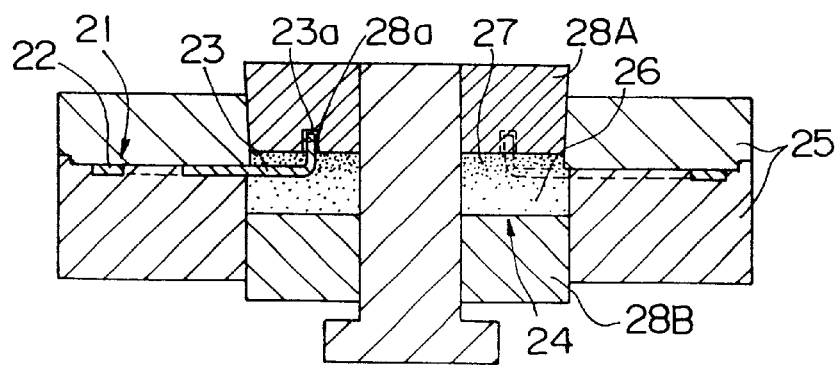
Figure 5:
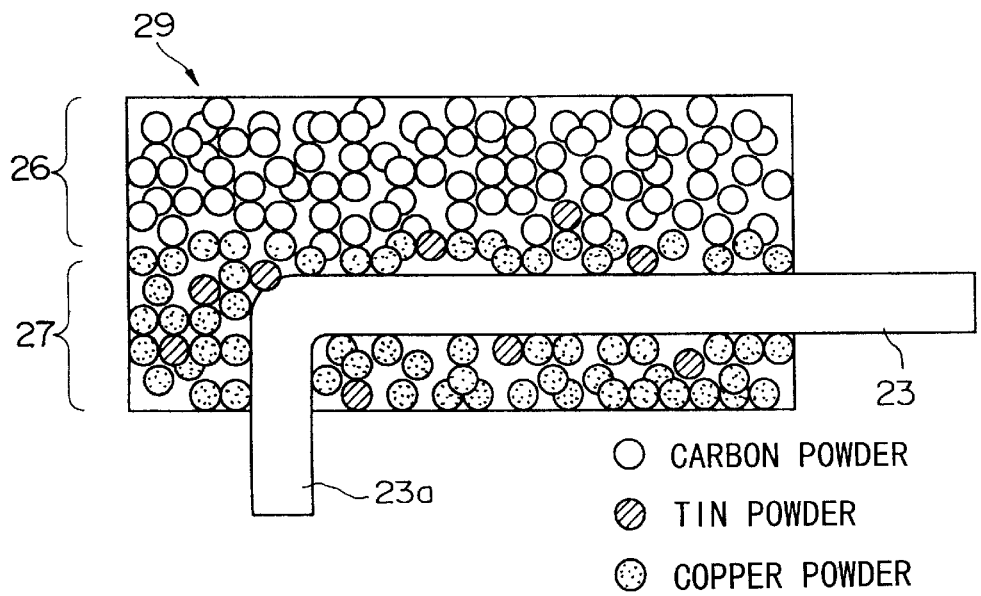
FIG. 5 is a schematic cross-sectional view of a green compact 29 in the method for producing the carbon commutator 1 according to the embodiment of the present invention.

The carbon powder layer 26 and the metal powder layer 27 in the cavity 24 are compressed and molded together with the riser piece element plate 21 by pressure hardening templates 28A and 28B at a comparatively high compacting pressure of around 3 t/cm² using an oil hydraulic press as shown in FIG. 4(c), so that an annular green compact (compressed powder compact) 29 including two layers, which are the carbon powder layer 26 and the metal powder layer 27, is formed as shown in FIG. 5. In the powder compacting, the bent inner ends 23a of the riser piece elements 23 protrude from the metal powder layer 27 so as to be accommodated in recesses 28a on the pressure hardening template 28A. Then, the molded green compact 29 is removed together with the riser piece elements 21 from the green compact mold 25.

Figure 6:
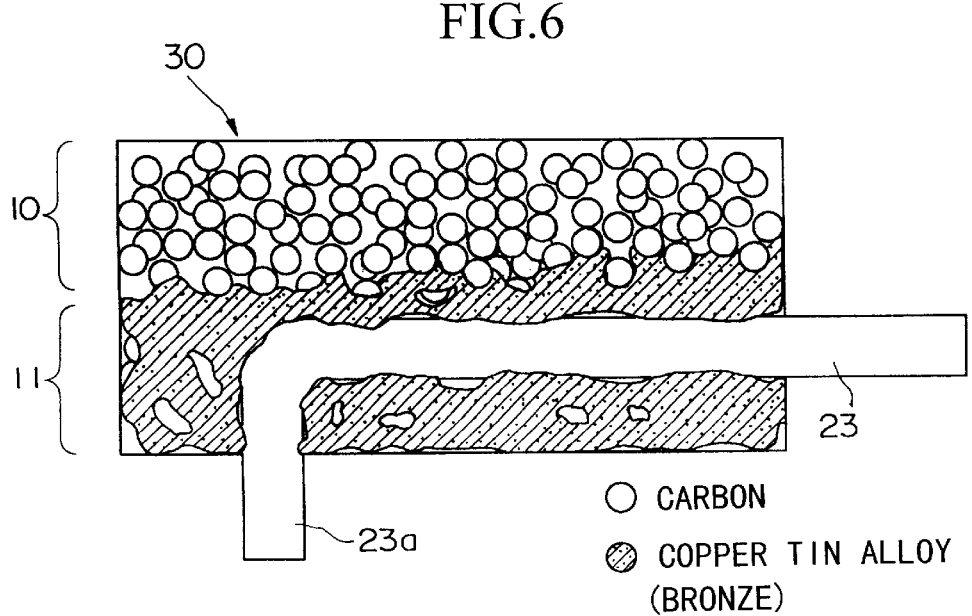
FIG. 6 is a schematic cross-sectional view of a sintered compact 29 in the method for producing the carbon commutator 1 according to the embodiment of the present invention.
Figure 7A:
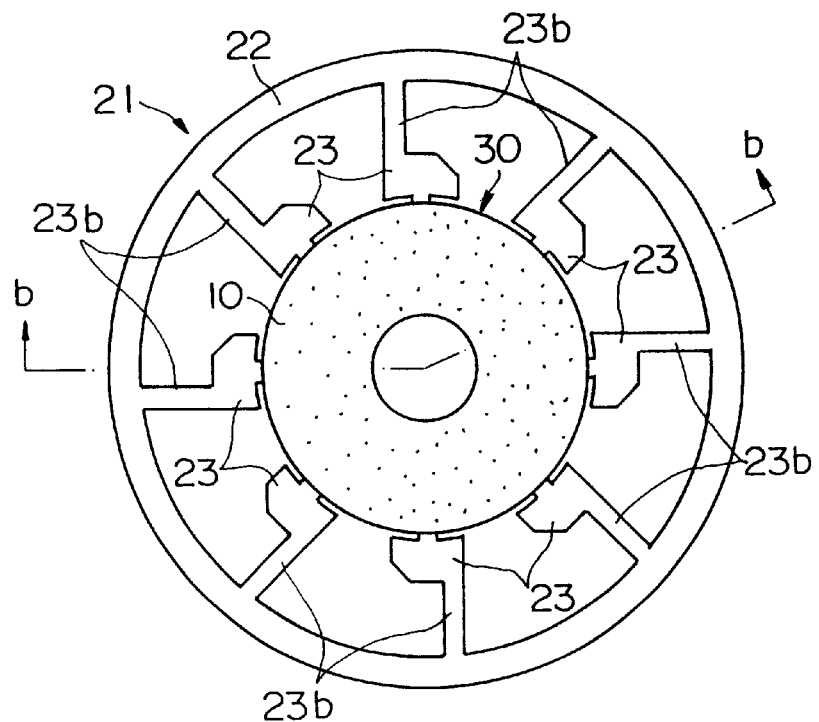
FIG. 7(a) is a top view showing the sintered compact 30 to which the riser piece element plate 21 is connected.
Figure 7B:
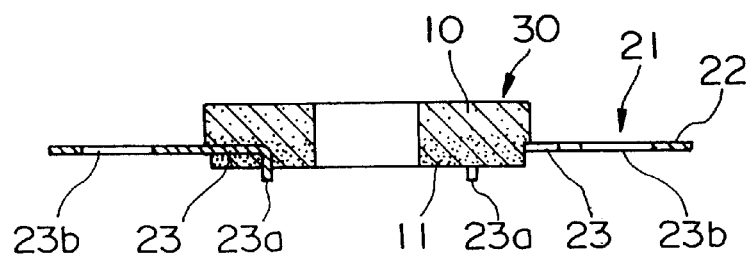
FIG. 7(b) is a cross-sectional view from line b—b of FIG. 7(a).

Next, the green compact 29 is charged and baked in a sintering furnace, so that an annular sintered compact 30 of a prototype of the segments 3 is obtained as shown in FIGS. 6 and 7. In this process, the carbon powder layer 26 and the metal powder layer 27 of the green compact 29 are sintered together to produce the sintered compact 30. The carbon powder in the carbon powder layer 26 is bound with the binder so that the carbon layer 10 is formed, while liquid phase sintering occurs in the metal powder layer 27 so that surfaces of the riser piece elements 23 are alloyed with the copper powder and the tin powder, thus forming the metal layer 11 integrally combined with the riser piece elements 23. The carbon layer 10 around the top surface 3a, which is the sliding member of the segments 3, and the metal layer 11 around the rear surfaces 3d are electrically and mechanically combined with the riser piece element 23 which is the riser piece 4. Preferably, the temperature at which the green compact 29 is sintered to produce the sintered compact 30 is set in a range of 800 to 850° C., and in this embodiment, the temperature is set to approximately 825° C.

Subsequently, the boss member 2 is integrally formed by pressing (molding) using insulating resin. In the sintered compact 30 shown in FIG. 7, the ends of the riser piece elements 23 (the ends 4a and the wide portions 4b of the riser pieces 4) protrude from the circumference of the annular sintered compact 30. The ring-shaped member 22 is still integrally connected around the circumference. The inner ends 23a of the riser piece elements 23 protrude from surfaces of the metal layer 11 corresponding to the rear surface 3d of the segment 3. The sintered compact 30 is accommodated in a mold which has a circular cavity with a diameter greater than the diameter of the sintered compact 30 by the thickness of the outside wall 6 of the boss member 2 and in which a column corresponding to the position of the axis hole 8 is built. The surface of the metal layer 11 faces the cavity and the axes of the sintered compact 30 and the cavity are aligned. Subsequently, molten resin is fed into the cavity, and pressing and cooling are carried out. Thus, the boss member 2, which has the inside wall 5, the outside wall 6, and the axis hole 8, and in which the inner ends 23 of the riser piece elements 23 are embedded into the top surface 2a, is integrally formed with the sintered compact 30.

After the boss member 2 is integrally formed with the sintered compact 30, the riser piece element plate 21 is still attached around the circumference of the boss member 2. The connections between the outer ends 23b of the riser piece elements 23 of the riser piece element plate 21 and the ring-shaped member 22 are cut down to separate the riser piece elements 23. The wide portions 4b are bent toward the rear and are curved along the circumference of the outside wall 6, and the outer ends 23b are bent so as to have a V-shape, forming the riser pieces 4 into the above-described shapes. Between neighboring riser pieces 4, the slits 7 have a depth formed by cutting completely through the sintered compact 30 and slightly into the top surface 2a of the boss member 2, so as to extend in radial directions of the annular sintered compact 30 from the circumference of the outside wall 6 to the axis hole 8. The sintered compact 30 is thus divided into sectorial blocks of the segments 3, which are insulated from each other, at which point the carbon commutator 1 is completed.

In the manufactured carbon commutator 1, because the top surfaces 3a corresponding to sliding members on the brush contain the carbon layers 10, erosion of the segments 3 and deterioration of the fuel can be prevented even in the motor in the in-tank type fuel feed pump for fuel which contains a large portion of alcohol. On the other hand, by sintering copper with tin to produce the metal layer 11 around the riser pieces 4 and by alloying the metal layer 11 with the riser pieces 4 through liquid phase sintering, the segments 3 and the riser pieces 4 are reliably integrated electrically and mechanically. Further, through the liquid phase sintering of the metal layer 11, the small copper powder particles melt prior to the others and are deposited on large particles, thereby rearranging the particles, so that compressive stress due to thermal expansion in the riser pieces 4 (riser piece elements 23) can be relaxed. Furthermore, because gaps around the riser piece elements 23 are filled with the liquid phase irrespective of thermal expansion and contraction in the riser piece elements 23, the sintered segments 3 can be more reliably and firmly integrated with the riser pieces 4.

Because the liquid phase occurs and exists in the metal layer 11, compressive stress between the carbon layer 10 and the metal layer 11 is relaxed. Even when gaps occur between the carbon layer 10 and the metal layer 11 due to difference in contraction and expansion during the sintering of the green compact 29, the gaps are filled with the liquid phase of copper tin alloy, and this secures the bonding of the carbon layer 10 to the metal layer 11. The molten copper tin alloy in the liquid phase sintering is apt to come in between the particles of the carbon layer 10, so that an anchoring effect can be obtained between the carbon layer 10 and the metal layer 11, thereby making separation thereof difficult.

According to the carbon commutator 1 with the above construction, irregularity in electrical resistance values between the segments 3 and contact failure between the segments 3 and the riser pieces 4 due to incomplete bonding can be prevented. Even in a fuel including alcohol mentioned above, superior stability and performance on a long-term basis can be obtained.

While in the embodiment the weight ratio of the copper to the tin in the metal layer 11 is set to 90:10, when the tin component in the weight ratio is too high, a brittle phase of the intermetallic compound of copper and tin may form in the metal layer 11 during the sintering of the green compact 29, and this may inhibit secure bonding of the segments 3 and the riser pieces 4. Further, it is undesirable that depending on the sintering temperature the concentration of tin component in the metal layer 11 may exceed the upper limit of the concentration of tin in a stable a solid solution in the copper tin alloy series. On the other hand, when the tin component ratio is too low, the molten tin alloys preferentially with the copper powder particles, which have small diameters and are apt to alloy, thereby reducing the ratio of alloy with the riser pieces 23. This is undesirable because secure bonding of the segments 3 and the riser pieces 4 may be inhibited.

Figure 8:
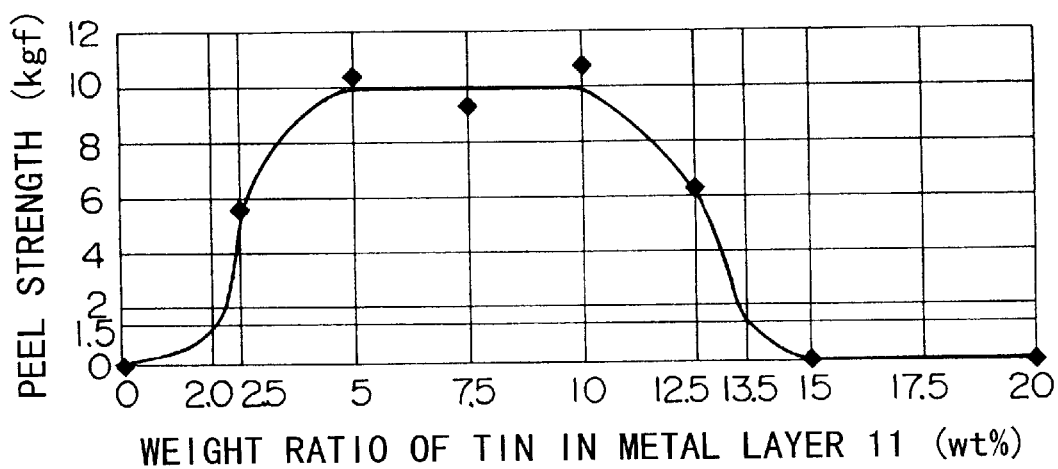
FIG. 8 is a graph showing a relationship between a weight ratio of a tin component in a metal layer 11 and a peeling strength of the metal layer 11, a carbon layer 10, and a riser piece 4 (copper plate 31).
Figure 9:
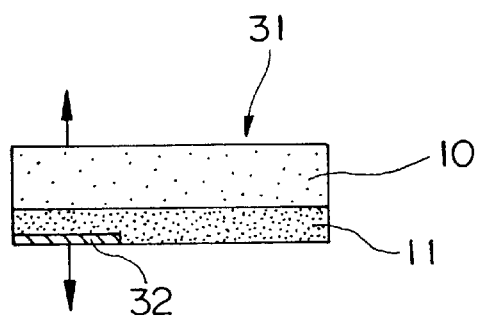
FIG. 9 is a cross-sectional view of a test piece used in the measurement of the relationship shown in FIG. 8.

For example, FIG. 8 shows the tensile load (peel strength) at which point separation occurs between a copper plate 32 corresponding to the riser piece and the metal layer 11 produced by sintering of the copper and the tin, or between the metal layer 11 and the carbon layer 10, in a test piece 31 shown in FIG. 9, which is pulled in the direction indicated by the arrow in the Figure, as the weight ratio of the tin component in the metal layer 11 varies. As shown in FIG. 8, when the weight ratio of the tin component is low, the peel strength, that is, the bonding strength is increased as the weight ratio of the tin component is increased. When the weight ratio of the tin component is in a range of 5.0 to 10.0 wt %, it becomes stable at a high strength of approximately 10 kgf. As the weight ratio of the tin component is increased further, the bonding strength decreases. Further, when the weight ratio of the tin component is low, the copper plate 32 and the metal layer 11 are separated, whereas when the weight ratio is high, the carbon layer 10 and the metal layer 11 are separated in the test piece 31.

As is generally known, the bonding strength in the segments of approximately 1.5 kgf is sufficient in the commutator. Accordingly, from the result shown in FIG. 8, the weight ratio of the tin component of more than 2.0 wt % in the metal layer 11 may be sufficient. On the other hand, in the copper tin alloy, the upper limit of the tin component concentration in the stable a solid solution around 800° C. where the liquid phase sintering occurs is 13.5 wt %. Accordingly, the weight ratio of the copper to the tin is preferably set in arrange of 98.0:2.0 to 86.5:13.5. To secure bonding with a strength between the metal layer 11, the riser pieces 4, and the carbon layer 10 sufficient enough to prevent the separation even when the sintering temperature is varied, the weight ratio of the copper to the tin in the metal layer 11 is preferably set in a range of 95.0:5.0 to 90.0:10.0.

In the method for producing the carbon commutator 1, the carbon powder and the mixed powder of copper and tin, which are layered together, are pressed to form the green compact 29 with the riser piece element plate 21, the green compact 29 is sintered at 825° C. to produce the sintered compact 30, and the segments 3 are thereafter formed. When the sintering temperature is too low, the phase liquid sintering is not sufficiently promoted, thus inhibiting the secure bonding of the segments 3 with the riser pieces 4. When the sintering temperature is too high, the copper component melting into the phase of the molten tin is increased, and may flow out along the riser piece elements 23 in the sintering process, and the shape of the sintered compact 30 may not be maintained. To avoid this, the sintering temperature is preferably set in a range of 800° C. to 850° C. as described above when the green compact 29 including the carbon powder layer 26 and the metal powder layer 27 is sintered to provide the segments 3.

Preferably, when forming the green compact 29, one of the carbon powder layer 26 and the metal powder layer 27 (the carbon powder layer 26 in this embodiment) is formed in the mold 25, is temporarily pressed to regulate its thickness, and the other layer (the metal powder layer 27 in this embodiment) is formed and pressed. The processes regulate the thickness of the carbon layer 10 and the metal layer 11 in the sintered segment 3. For example, even when friction occurs on the top surfaces 3a of the segments 3 which are the sliding members on the brush, the metal layers can be prevented from being partly exposed because of the irregular thickness of the carbon layers 10, and this prevents shortening of the life of the carbon commutator 1 due to the exposure of the metal layer 11.

While in the embodiment the carbon powder layer 26 is formed and is temporarily pressed, and the metal powder layer 27 is thereafter formed, the riser piece element plate 21 may be positioned near the bottom of the compacting mold 25, copper and tin powders may be fed in to form the metal powder layer 27 and may be temporarily pressed to regulate its thickness, and thereafter a carbon powder may be fed in to form the carbon powder layer 26. While in the embodiment the metal powder layer 27 is formed around the riser piece elements 23, the metal layers 11 may be formed such that the metal powder layer 27 may be formed on the surface of the riser piece elements 23 only on the side of the carbon powder layer 26, thus advantageously making the segments 3 thinner.

In the method of the embodiment according to the present invention, the annular green compact 29 is compressed and sintered together with the riser piece element plate 21 to which the riser piece elements 23 are connected, the boss member 2 of the insulating resin is formed by pressing on the annular sintered compact 30, and the segments 3 are formed by cutting the slits 7 so that the segments 3 are insulated from each other. Alternatively, sectorial blocks of green compacts 29 may be shaped and sintered together with separated riser piece elements 23, the boss member 2 may be formed by pressing an insulating resin onto the sintered segments 3 arranged in a circumferential direction at intervals, and these segments 3 may be integrated, thus completing manufacturing the carbon commutator 1. Instead of the process of sintering the annular green compact 29 to obtain the annular sintered compact 30, a green compact of a solid disc shape may be sintered to obtain a sintered compact of a solid disc shape, a passage hole may be made in its center, and the sintered compact may be divided into sectorial segments 3.

In the carbon commutator 1 of the embodiment, the ends 4c of the riser pieces 4 vertically protrude from the rear surfaces 3d of the segments 3 and are embedded into the top surfaces 2a of the boss member 2, thus ensuring a sufficient enough strength of the bonding of the boss member 2 to the segments 3. The ends 4c may be bent at an angle toward the outer circumference before pressing the boss member 2, and this may increase the bonding strength. Without the protruding ends 4c of the riser pieces 4, or in addition to the above construction, grooves may be formed on the curved surfaces of the inside and outside circumferences of the segments 3 or chamfers may be made at corners between these irregularly curved surfaces and the top surfaces 3a of the segments 3, and the boss member 2 may thereafter be formed by pressing resin, so that the resin covers the grooves and the chamfers to engage the segments 3 with the boss member 2, thereby increasing the bonding strength.

While in the carbon commutator 1 of the embodiment each of the carbon layer 10 and the metal layer 11 in the segment 3 has approximately ½ of the thickness of that of the segment 3, the metal layer 11 may be formed only around the riser piece 4, an intermediate layer may be formed between the carbon layer 10 and the metal layer 11, and the ratio of the copper and tin components to the carbon component may be increased from the carbon layer 10 toward the metal layer 11. Although in the embodiment the carbon commutator of the present invention used in the in-tank type fuel feed pump is explained, the invention is not limited to this embodiment and may be applied to other types of motor. The present invention, in which carbon commutator 1 is flattened in the embodiment, may be applied to other general column-shaped commutators.

Second Embodiment

Figure 10:
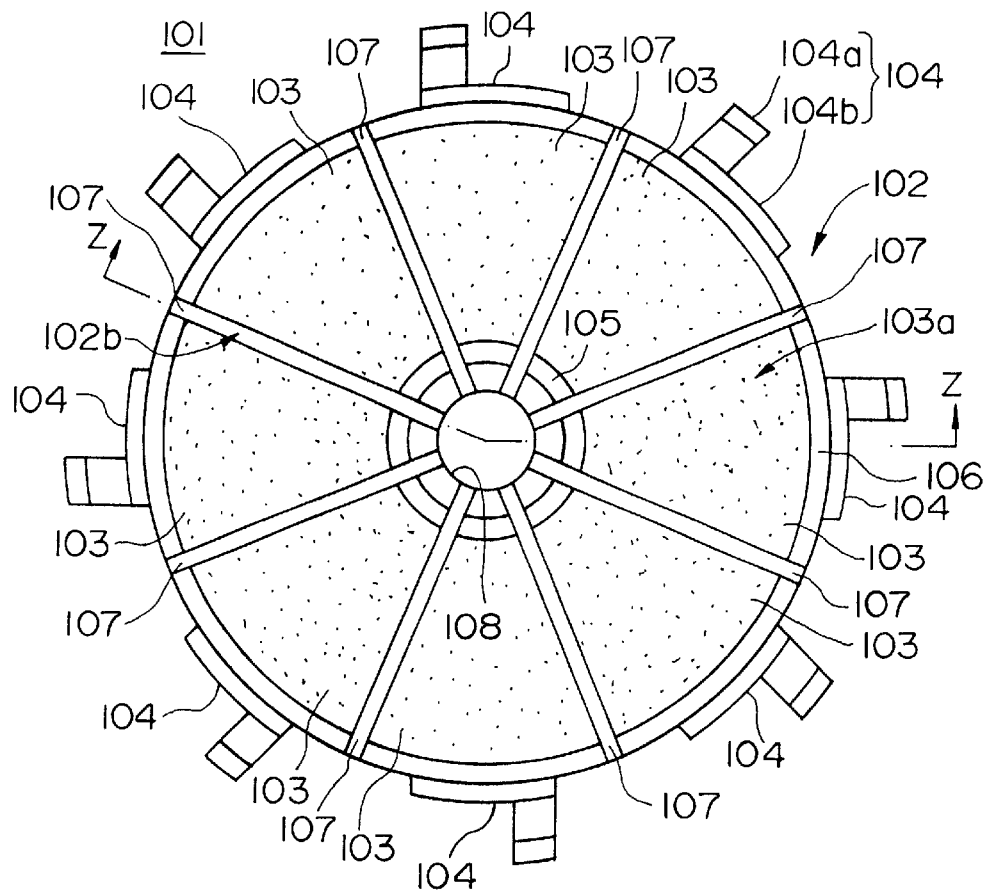
FIG. 10 is a top view showing a side of top surfaces 103a of segments 103 of carbon commutator 101 according to an embodiment of the present invention.
Figure 11:
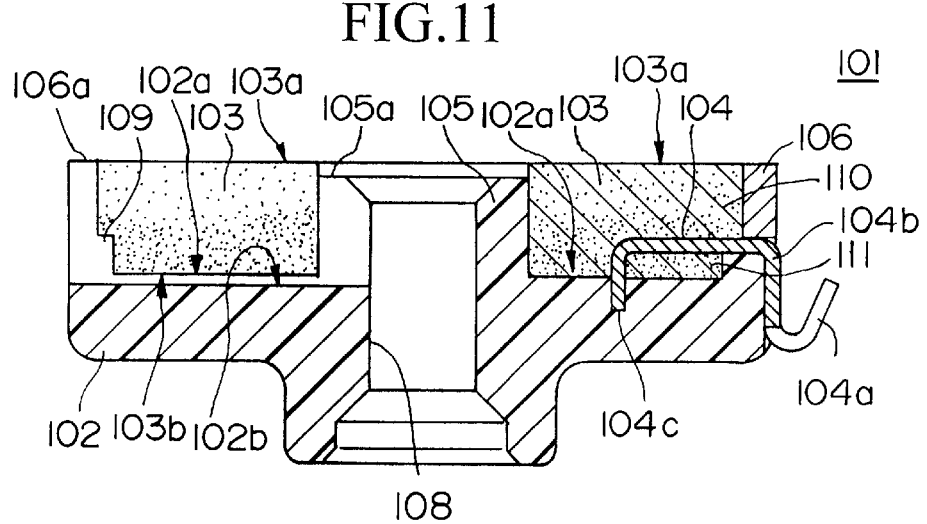
FIG. 11 is a cross-sectional view from line Z—Z of FIG. 10.

FIGS. 10 and 11 show one embodiment of a carbon commutator according to the present invention. The carbon commutator 101 of the invention, which is applied to, for example, a motor in an in-tank type fuel feed pump, is flattened, and comprises a nearly disc-shaped boss member 102 made of insulating resin, and a plurality of segments 103 (eight segments in this embodiment) which are located at regular intervals in a circumferential direction, forming an annular shape on a circular top surface 102a of the boss member 102. Top surfaces 103a of the segments 103 are sliding members in contact with a brush of a motor. Further, each segment 103 has a riser piece 104 which is a conductive terminal member, and one end 104a of the riser piece 104 projects outward from the boss member 102.

On the top surface 102a of the boss member 102, a cylindrical inside wall 105 is built at the center and a cylindrical outside wall 106 is built at the periphery, while the top surfaces 103a of the segments 103 are shaped into sectorial blocks as shown in FIG. 10. The segments 103 are located so that inner and outer circumference surfaces are in contact with the inside and outside walls 105 and 106, forming a radial shape with the center at the inside wall 105, and are arranged in a circumferential direction on the boss member 102 as described above. Between the neighboring segments 103, slits 107 extend in radial directions on the boss member 102 to form grooves 2b indented by one step from the top surface 102a through the inside wall 105 and the outside wall 106, insulating the neighboring segments 103 from each other. An axis hole 108 in the inside wall 105 reaches the other surface of the boss member 102, and is used to mount the carbon commutator 101 to the rotation axis of the motor. A top surface 105a of the inside wall 105 is lower than the top surfaces 103a of the segments 103, while the top surface 106a of the outside wall 106 corresponds to the top surfaces 103a. A step 109 is shaped on corners between the top surface 102a of the boss member 102 and an inside surface of the outside wall 106.

The riser pieces 104, which are conductive terminal members in this embodiment, are formed into plate-shapes of copper or copper alloy, and are embedded above rear surfaces 103d of the segments 103 raised slightly towards the top surfaces 103a, as shown in FIG. 11. The riser pieces 104 extend outward in the radial direction of the boss member 102 from nearly the middle of the segment 103 through the outside wall 106, are bent at the rear portion to form L-shapes, and extend via wide portions 104b along the outside circumference of the outside wall 106 to ends 104a. The ends 104a are formed into V-shapes by bending projections, which extend outward, toward the front side. The other ends 104c of the riser pieces 104 project from the rear surfaces 103b of the segments 103 and are embedded vertically in top surface 102a of the boss member 102.

In the embodiment of the carbon commutator 101, portions including the top surfaces 103a, which are sliding members of the segments 103, are carbon layers 110 in which carbon and appropriate binder are mixed. Portions including the rear surfaces 103b around the riser pieces 104 are metal layers 111 of carbon, copper, and material which can alloy with the riser pieces 104 of the conductive terminal member and have a melting point lower than that of the riser pieces 104, for example, tin. In the metal layers 111, an alloy of copper and tin, that is bronze, is deposited due to liquid phase sintering of copper and tin, and this alloy affects the riser pieces 104 of copper or copper alloy, thus integrating the riser pieces 104 with the carbon layers 110 and the metal layers 111, that is, the segments 103. The percentage content by weight of the carbon in the metal layer 111 is in a range of 2 to 25 wt %, more preferably in a range of 10 to 20 wt %, and in the embodiment it is 15 wt %. The weight ratio of copper to tin, excluding the carbon, in the metal layers 111 is in a range from 98.0:2.0 to 86.5:13.5, and preferably in a range of 95.0:5.0 to 90.0:10.0, and in this embodiment, it is set to 90.0:10.0. The metal layers 111 have a thickness of approximately ½ of that of the segments 103. In addition, at least one material selected from the group of zinc, antimony, and lead may be substituted for all or a part of the tin in the metal layer 111.

Figure 12A:
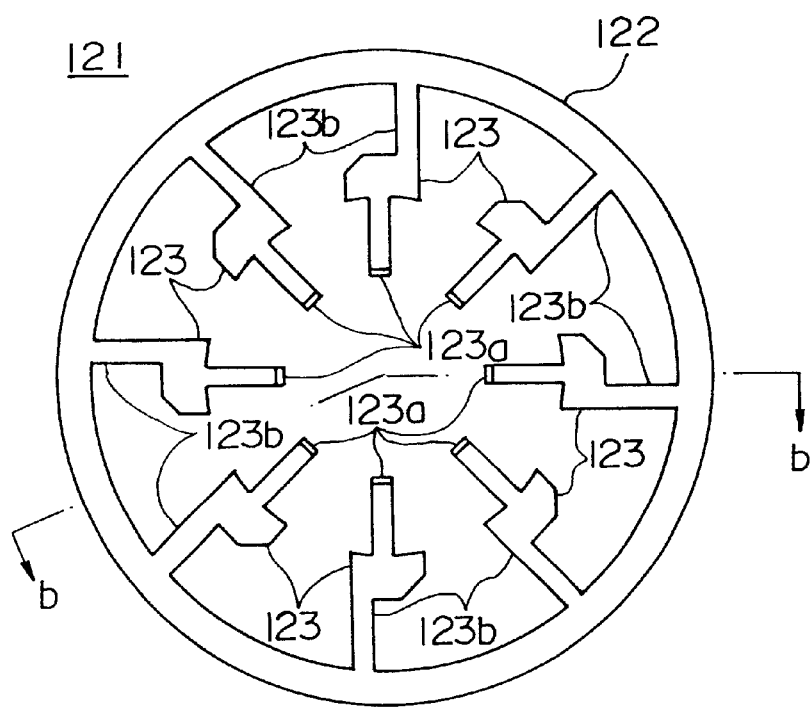
FIG. 12(a) is a top view showing a riser piece element plate 121 obtained by a method for producing the carbon commutator 101 according to the embodiment of the present invention.
Figure 12B:
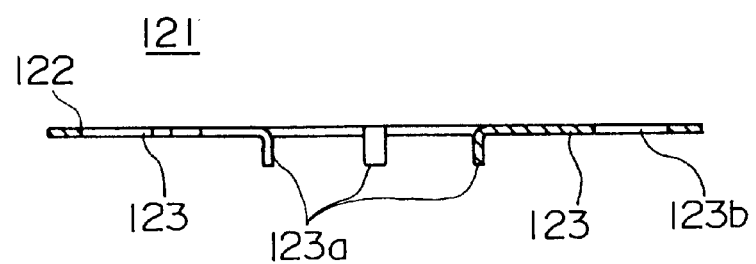
FIG. 12(b) is a cross-sectional view from line b—b of FIG. 12(a).

Referring to FIGS. 12 to 16, a method for producing the carbon commutator 101 described above according to the embodiment of the present invention will be explained. Before manufacturing the carbon commutator 101, a riser piece element plate 121, which is a prototype of the riser pieces 104 to be integrated with the segments 103 shown in FIG. 12, is prepared. The riser piece element plate 121 of circular outline is a copper plate or a copper alloy plate, and in this embodiment, is manufactured by pressing of an oxygen-free copper plate of 0.6 mm in thickness. The riser piece element plate 121 have an annular ring-shaped member 122 with an inner diameter greater than an outside diameter of the produced carbon commutator 101, and riser piece elements 123 of the same number of the riser pieces 104 are integrally formed at the inner rim of the ring-shaped member 122. The riser piece element plate 121 have the shape of unbent riser pieces 104 excluding the inner ends 123a as the above described other ends 104c of the riser pieces 104 which are bent beforehand, and extend in radial directions in a fashion similar to the riser pieces 104 in the segments 103 located in the circumferential direction in the finished carbon commutator 101. Outer ends 123b corresponding to the ends 104a of the riser pieces 104 are integrally connected to the ring-shaped member 122.

Figure 13A:
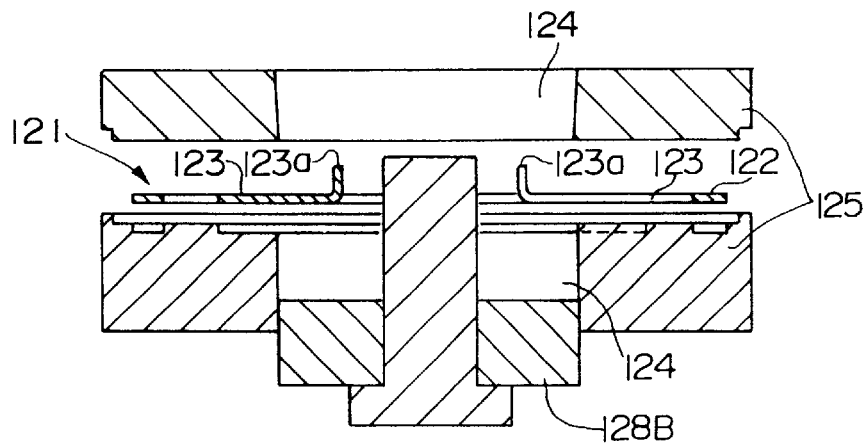
FIGS. 13(a) to 13(c) are cross-sectional views of a green compact mold 125 used in the method for producing the carbon commutator 101 according to the embodiment of the present invention.
Figure 13B:
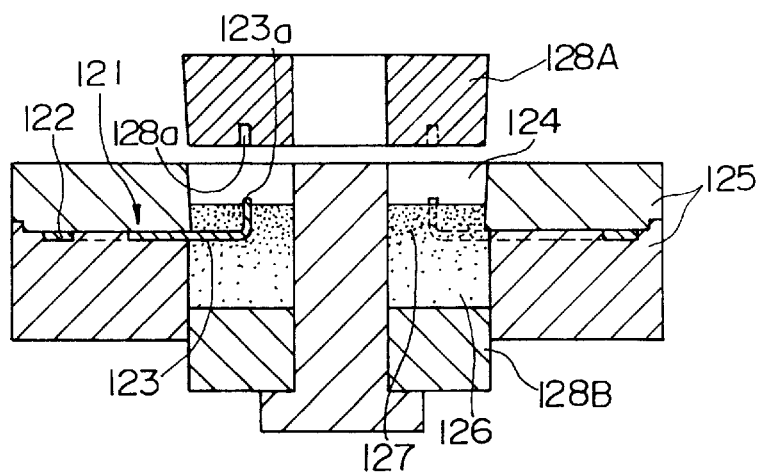

As shown in FIG. 13(a), the riser piece element plate 121 is placed on a green compact mold 125 with an annular cavity 124 whose dimensions are set in view of contraction in size in sintering with respect to the dimensions of the segments 103. The riser piece element plate 121 is placed such that the axes of the riser piece element plate 121 and the cavity 124 are aligned. As shown in FIG. 13(b), a mixed powder comprising the carbon powder and the binder is fed into the cavity 124 to form a carbon powder layer 126 on a side corresponding to the top surfaces 103a of the segments 103 (the bottom of the cavity 124). Subsequently, a mixed powder comprising carbon, copper, and tin is fed in to form a mixed powder layer 127 in a side corresponding to the rear surfaces 103d around the riser piece elements 123 of the riser piece element plate 121. In the embodiment, the mixed powder of the carbon powder layer 126 is produced by mixing the mixed carbon powder comprising natural and artificial graphite with a phenol binder, subsequently kneading, drying, grinding, and grading the powder by size, and regulating the grain size to less than 500 $\mu$m. The mixed powder of the mixed powder layer 127 is produced by blending the mixed carbon powder comprising natural and artificial graphite, an electrolytic copper powder, and a pulverized tin powder at a predetermined weight ratio and mixing the powders using a V-type mixer.

Figure 13C:
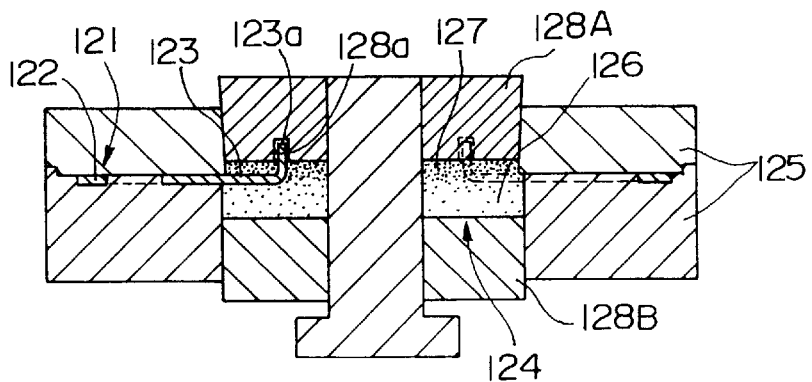
Figure 14:
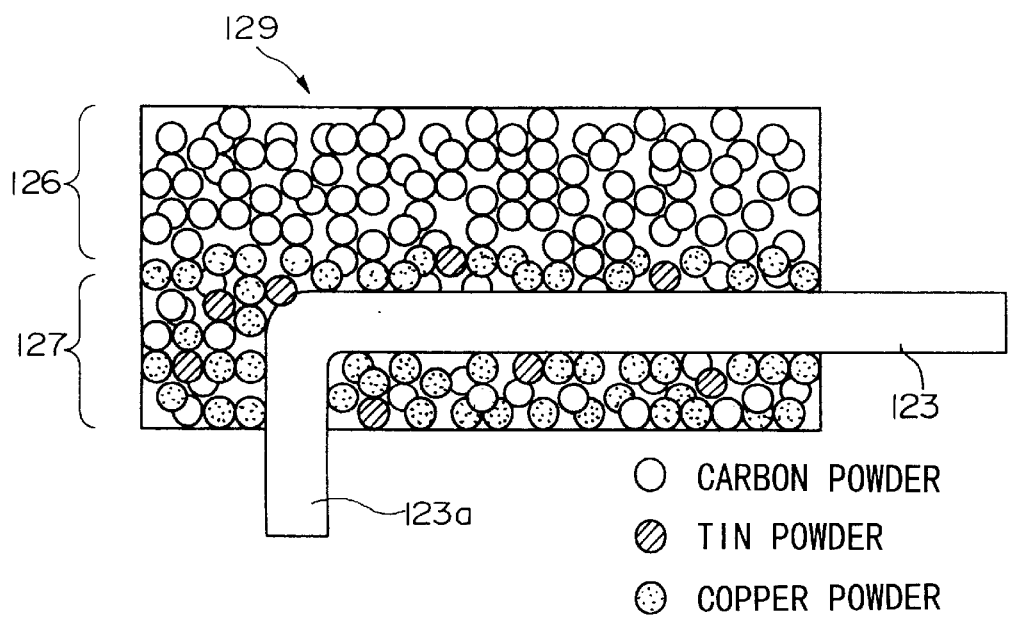
FIG. 14 is a schematic cross-sectional view of a green compact 129 in the method for producing the carbon commutator 101 according to the embodiment of the present invention.

Preferably, when filling the cavity 124 with the carbon powder layer 126 and the mixed powder layer 127, the carbon powder layer 126 is formed by filling the bottom side of the cavity 124 with the mixed powder comprising the carbon powder and the binder, subsequently the carbon powder layer 126 is made uniform in thickness by slightly pressing the carbon powder layer 126 using a temporary press template, and subsequently the mixed powder layer 127 is formed by feeding the mixed powder of copper and tin on the carbon powder layer 126. The carbon powder layer 126 and the mixed powder layer 127 in the cavity 124 are compressed and molded together with the riser piece element plate 121 by pressure hardening templates 128A and 128B at a comparatively high compacting pressure of around 3 t/cm$^2$ using an oil hydraulic press as shown in FIG. 13(c), so that an annular green compact (compressed powder compact) 129 including two layers, which are the carbon powder layer 126 and the mixed powder layer 127, is formed as shown in FIG. 14. In the powder compacting, the bent inner ends 123a of the riser piece elements 123 protrude from the mixed powder layer 127 so as to be accommodated in recesses 128a on the pressure hardening templates 128A.

Figure 15:
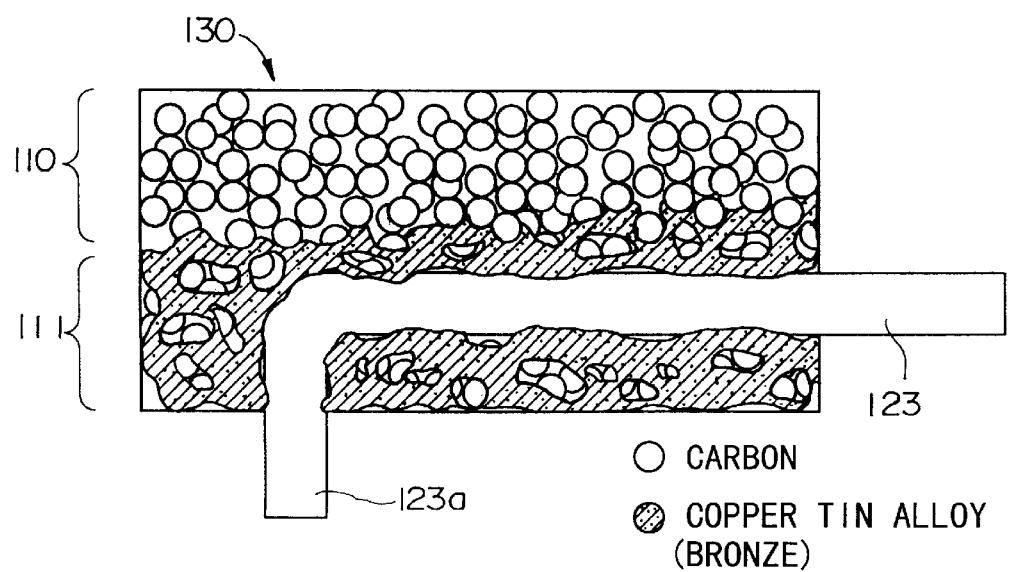
FIG. 15 is a schematic cross-sectional view of a sintered compact 129 in the method for producing the carbon commutator 101 according to the embodiment of the present invention.
Figure 16A:
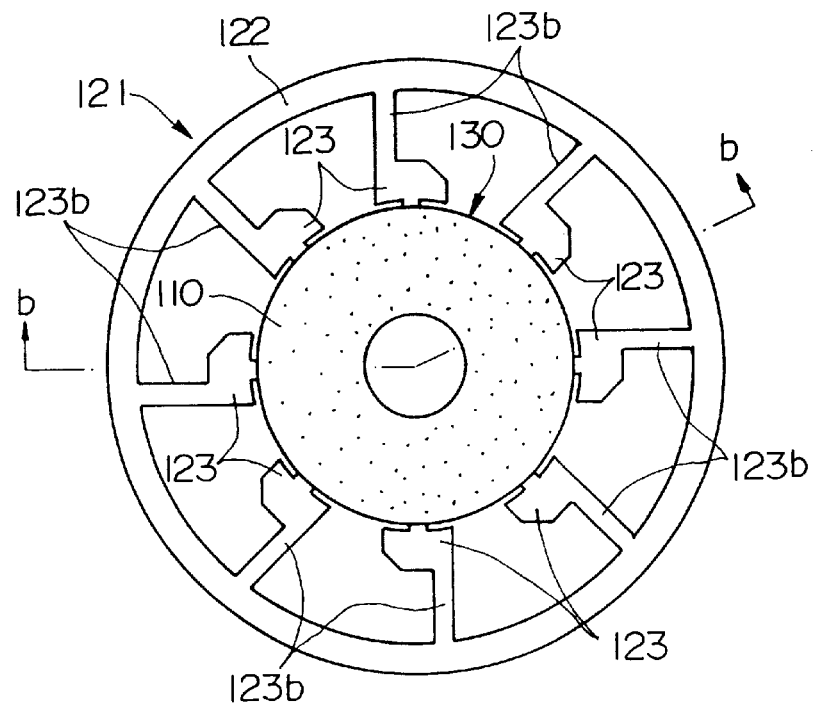
FIG. 16(a) is a top view showing the sintered compact 130 to which the riser piece element plate 121 is connected.
Figure 16B:
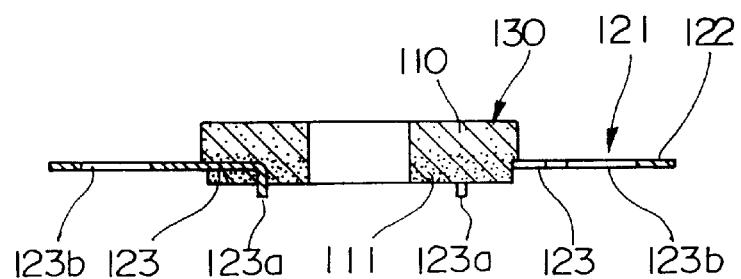
FIG. 16(b) is a cross-sectional view from line b—b of FIG. 7(a).

Then, the molded green compact 129 is removed together with the riser piece elements 21 from the green compact mold 125. Next, the green compact 129 is charged and baked in a sintering furnace, so that an annular sintered compact 130 of a prototype of the segments 103 is obtained as shown in FIGS. 15 and 16. In this process, the carbon powder layer 126 and the mixed powder layer 127 of the green compact 129 are sintered together to produce the sintered compact 130. The carbon powder in the carbon powder layer 126 is bound with the binder so that the carbon layer 110 is formed, while liquid phase sintering occurs in the mixed powder layer 127 so that surfaces of the riser piece elements 123 are alloyed with the copper powder and the tin powder, thus forming the metal layer 111 integrally combined with the riser piece elements 123. The carbon layer 110 around the top surface 103a, which is the sliding member of the segment 103, and the metal layer 111 around the rear surfaces 103d are electrically and mechanically combined with the riser piece element 123 which is the riser piece 104. Preferably, the temperature at which the green compact 129 is sintered to produce the sintered compact 130 is set in a range of 800 to 850° C., and in this embodiment, the temperature is set to approximately 825° C.

Subsequently, the boss member 102 is integrally formed by pressing (molding) using insulating resin. In the sintered compact 130 shown in FIG. 16, the ends of the riser piece elements 123 (the ends 104a and the wide portions 104b of the riser pieces 104) protrude from the circumference of the annular sintered compact 130. The ring-shaped member 122 is still integrally connected around the circumference. The inner ends 123a of the riser piece elements 123 protrude from surfaces of the metal layer 111 corresponding to the rear surface 103d of the segment 103. The sintered compact 130 is accommodated in a mold which has a circular cavity with a diameter greater than the diameter of the sintered compact 130 by the thickness of the outside wall 106 of the boss member 102 and in which a column corresponding to the position of the axis hole 108 is built. The surface of the metal layer 111 faces the cavity and the axes of the sintered compact 130 and the cavity are aligned. Subsequently, molten resin is fed into the cavity, and pressing and cooling are carried out. Thus, the boss member 102, which has the inside wall 105, the outside wall 106, and the axis hole 108, and in which the inner ends 123 of the riser piece elements 123 are embedded into the top surface 102a, is integrally formed with the sintered compact 130.

After the boss member 102 is integrally formed with the sintered compact 130, the riser piece element plate 121 is still attached around the circumference of the boss member 102. The connections between the outer ends 123b of the riser piece elements 123 of the riser piece element plate 121 and the ring-shaped member 122 are cut down to separate the riser piece elements 123. The wide portions 104b are bent toward the rear and are curved along the circumference of the outside wall 106, and the outer ends 123b are bent so as to have a V-shape, forming the riser pieces 104 into the above-described shapes. Between neighboring riser pieces 104, the slits 107 have a depth formed by cutting completely through the sintered compact 130 and slightly into the top surface 102a of the boss member 102, so as to extend in radial directions of the annular sintered compact 130 from the circumference of the outside wall 106 to the axis hole 108. The sintered compact 130 is thus divided into sectorial blocks of the segments 103, which are insulated from each other, at which point the carbon commutator 101 is completed.

In the manufactured carbon commutator 101, because the top surfaces 103a corresponding to sliding members on the brush contain the carbon layers 110, erosion of the segments 103 and deterioration of the fuel can be prevented even in the motor in the in-tank type fuel feed pump for fuel which contains a large portion of alcohol. On the other hand, by sintering carbon, copper, and tin to produce the metal layer 111 between the riser piece 104, which is the conductive terminal member, and the carbon layer 110, and by alloying the metal layer 111 with the riser pieces 104 through liquid phase sintering, the segments 103 and the riser pieces 104 are reliably integrated electrically and mechanically, and the molten copper tin alloy in the liquid phase sintering comes in between the particles of the carbon layer 110, so that an anchoring effect against the carbon layer 110 can be obtained. Further, the carbon contained in the metal layer 111 is bound with the carbon layer 110, providing the anchoring effect therebetween, and the sintered segments 103 can be more reliably and firmly integrated with the riser pieces 104.

Through the liquid phase sintering of the metal layer 111, the small copper powder particles melt prior to the others and are deposited on large particles, thereby rearranging the particles, so that compressive stress due to thermal expansion in the riser pieces 104 (riser piece elements 123) can be relaxed, and gaps around the riser piece elements 123 are filled with the liquid phase irrespective of thermal expansion and contraction in the riser piece elements 123. The existing liquid phase relaxes the compressive stress between the carbon layer 110 and the metal layer 111. Even when gaps occur between the carbon layer 110 and the metal layer 111 due to difference in contraction and expansion therebetween during the sintering of the green compact 129, the gaps are filled with the liquid phase of copper tin alloy. The metal layer 111 contains the carbon, so that the thermal stress between the carbon layer 110 and the metal layer 111 is relaxed. Therefore, the bonding between the carbon layer 110 and the metal layer 111, and the bonding between the metal layer 111 and the riser piece 104 are difficult to break. According to the carbon commutator 101 with the above construction, irregularity in electrical resistance values between the segments 103 and contact failure between the segments 103 and the riser pieces 104 due to incomplete bonding can be prevented. Even in a fuel including alcohol mentioned above, superior stability and performance on a long-term basis can be obtained.

The copper tin alloy in the metal layer 111 produced by the liquid phase sintering is harder than a conventional layer produced by sintering only the copper powder. When the metal layer 111 comprises only the copper tin alloy, workability of the sintered compact 130 in the formation process of the slits 107, which insulate the segments 103 from each other, becomes worse, and this lengthens machining time and leads to shortening of the life of a cutting tool for making the slits. In the carbon commutator 101, the metal layer 111 contains the carbon which is comparatively soft, and this prevents the metal layer 111 from becoming too hard. It is therefore possible to shorten the machining time and to lengthen the life of the cutting tool. When the metal layer 111 comprises only the copper and the tin and the sintering temperature is too high, the liquid phase may flow out during the sintering process, and the shape of the sintered compact 130 may not be maintained. In the carbon commutator 101, the carbon in the metal layer 111 does not soften and melt, and works as aggregate to stabilize the shape of the metal layer 111, so that the sintered compact 130 having the desired shape and dimensions can be formed.

While in the embodiment the percentage content in weight of the carbon contained in the metal layer 111 is 15 wt %, when the percentage content of the carbon is too low, the metal layer 111 becomes too hard because of the remaining copper tin alloy makes the metal and damage during the processing of the segments 103 cannot be prevented. Further, the anchoring effect and the relaxation of the thermal compressive stress against the carbon layer 110 according to the carbon in the metal layer 111, and the stabilization of the shape of the sintered compact 130 cannot be achieved. When the percentage content of the carbon in the metal layer 111 is too high, the carbon does not react to the copper in the riser piece 104, insufficiently bonding the riser piece 104 to the metal layer 111, which thereby separate easily.

Figure 17:
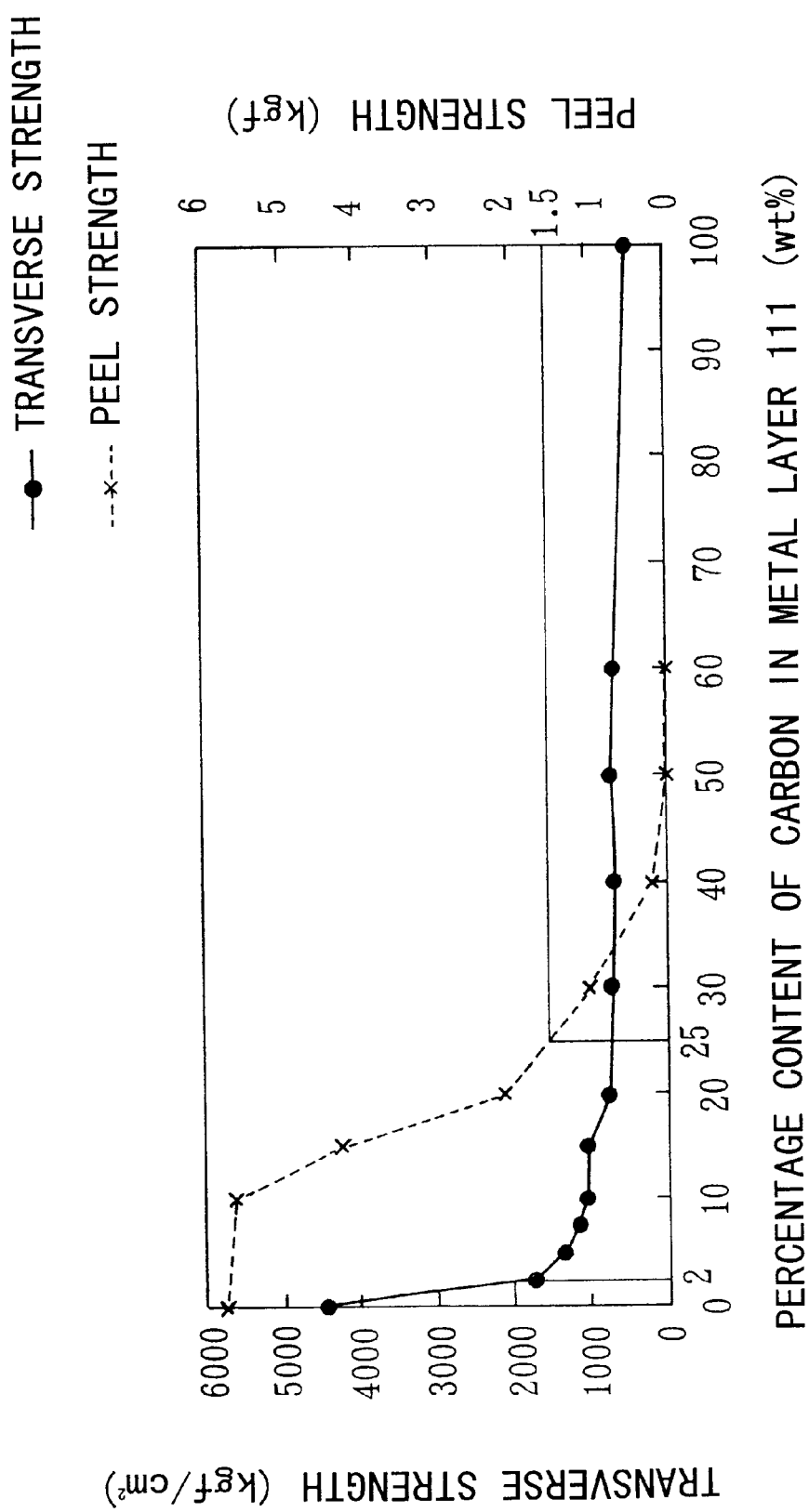
FIG. 17 is a graph showing a relationship between a percentage content of carbon in a metal layer 111, a transverse strength of the metal layer 111, and a peel strength between the metal layer 111, a carbon layer 110, and a riser piece 104 (copper plate 133).
Figure 18:
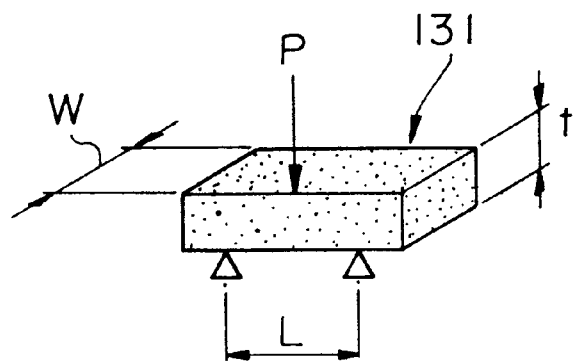
FIG. 18 is a perspective view showing a test piece 131 used in the measurement of the transverse strength shown in FIG. 17.
Figure 19:
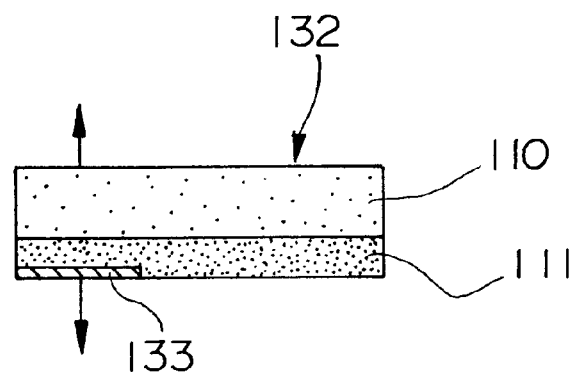
FIG. 19 is a perspective view showing a test piece 132 used in the measurement of the peel strength shown in FIG. 17.

For example, FIG. 17 shows how the workability of the metal layer 111 and the peel strength depending on the percentage content of the carbon in the metal layer 111, in a test piece 131 of the metal layer 111 shown in FIG. 18 and in a test piece 132 of the segment 103 shown in FIG. 19. To determine the workability of the metal layer 111, the test piece 131 has a width "W" cm and a thickness "t" cm and is sintered under the same condition as the carbon, the copper, and the tin in the embodiment, excluding the percentage content of the carbon. As shown in FIG. 18, the test piece 131 is supported at two points distant from each other by L cm, a load is applied on the test piece 131 at a middle point of the two points in a direction of the thickness, a transverse strength (kgf/cm$^2$) is calculated from a maximum load P kgf according to $1.5 \times P \times L/(W \times t^2)$ when the test piece 131 is broken. To determine the peel strength, the test piece 132 is sintered in a manner similar to the above, including the carbon layer 110. A tensile load (peel strength) is measured when separation occurs between a copper plate 132 corresponding to the riser piece and the metal layer 111, or between the metal layer 111 and the carbon layer 110, in a test piece 131 which is pulled in the direction indicated by the arrow in the FIG. 19.

As is obvious from FIG. 17, the transverse strength of the test piece 131 and the peel strength of the test piece 132 gradually decrease as the percentage content of the carbon in the metal layer 111 increases. That is, the workability is enhanced and separation becomes easy as the percentage content of the carbon increases. In the slitting process for the sintered compact 130 comprising the carbon, the copper, and the tin, lengthening of the machining time and shortening of the life of the cutting tool can be prevented when the transverse strength is less than 2000 kgf/cm$^2$. Preferably, from the result of the transverse strength in FIG. 17, the percentage content of the carbon in the metal layer 111 may be more than 2 wt %. In general, 1.5 kgf of the peel strength of the segment 103 is sufficient in the commutator. Preferably, from the result shown in FIG. 17, the percentage content of the carbon in the metal layer 111 may be less than 25 wt %. To make satisfactory workability consistence with sufficient peel strength irrespective of the fluctuation in sintering temperature during the formation of the sintered compact 130, the percentage content of the carbon in the metal layer 111 may preferably be in a range of 10 to 20 wt %.

While in the embodiment the weight ratio of the copper to the tin, excluding the carbon, in the metal layer 111 is set to 90:10, when the tin component in the weight ratio is too high, a brittle phase of the intermetallic compound of copper and tin may form in the metal layer 111 during the sintering, and this may inhibit secure bonding of the segments 103 and the riser pieces 104. Further, it is undesirable that depending on the sintering temperature the concentration of tin component in the metal layer 111 may exceed the upper limit of the concentration of tin in a stable α solid solution in the copper tin alloy series. On the other hand, when the tin component ratio is too low, the molten tin alloys preferentially with the copper powder particles, which have small diameters and are apt to alloy, thereby reducing the ratio of alloy with the riser pieces 123. This is undesirable because secure bonding of the segments 103 and the riser pieces 104 may be inhibited. From the sufficient peel strength to be given to the segment 103 in the carbon commutator and from 13.5 wt % of the upper limit of the tin component concentration in the stable a solid solution around 800° C. where the liquid phase sintering occurs, the weight ratio of the copper to the tin is preferably set in a range of 98.0:2.0 to 86.5:13.5, and more preferably in a range of 95.0:5.0 to 90.0:10.0.

In the method for producing the carbon commutator 101, the carbon powder and the mixed powder of carbon, copper, and tin, which are layered together, are pressed to form the green compact 129 with the riser piece element plate 121, the green compact 129 is sintered at 825° C. to produce the sintered compact 130, and the segments 103 are thereafter formed. When the sintering temperature is too low, the phase liquid sintering is not sufficiently promoted, thus inhibiting the secure bonding of the segments 103 with the riser pieces 104. When the sintering temperature is too high, the copper component melting into the phase of the molten tin is increased, and may flow out along the riser piece elements 123 in the sintering process, and the shape of the sintered compact 130 may not be maintained despite the effect provided by the carbon as the aggregate. To avoid this, the sintering temperature is preferably set in a range of 800° C. to 850° C. as described above when the green compact 129 including the carbon powder layer 126 and the mixed powder layer 127 is sintered to provide the segments 103.

Preferably, when forming the green compact 129, one of the carbon powder layer 126 and the mixed powder layer 127 (the carbon powder layer 126 in this embodiment) is formed in the mold 125, is temporarily pressed to regulate its thickness, and the other layer (the mixed powder layer 127 in this embodiment) is formed and pressed. The processes regulates the thickness of the carbon layer 110 and the metal layer 111 in the sintered segment 103. For example, even when friction occurs on the top surfaces 103a of the segments 103 which are the sliding members on the brush, the metal layers can be prevented from being partly exposed because of the irregular thickness of the carbon layers 110, and this prevents shortening of the life of the carbon commutator 101 due to the exposure of the metal layer 111.

While in the embodiment the carbon powder layer 126 is formed and is temporarily pressed, and the mixed powder layer 127 is thereafter formed, the riser piece element plate 121 may be positioned near the bottom of the green compact mold 125, carbon, copper, and tin powders may be fed in to form the mixed powder layer 127 and may be temporarily pressed to regulate its thickness, and thereafter a carbon powder may be fed in to form the carbon powder layer 126. While in the embodiment the mixed powder layer 127 is formed around the riser piece elements 123, the metal layers 111 may be formed such that the mixed powder layer 127 may be formed on the surface of the riser piece elements 123 only on the side of the carbon powder layer 126, thus advantageously making the segments 103 thinner.

In the method of the embodiment according to the present invention, the annular green compact 129 is compressed and sintered together with the riser piece element plate 121 to which the riser piece elements 123 are connected, the boss member 102 of the insulating resin is formed by pressing on the annular sintered compact 130, and the segments 103 are formed by cutting the slits 107 so that the segments 103 are insulated from each other. Alternatively, sectorial blocks of green compacts 129 may be shaped and sintered together with separated riser piece elements 123, the boss member 102 may be formed by pressing an insulating resin onto the sintered segments 103 arranged in a circumferential direction at intervals, and these segments 103 may be integrated, thus completing manufacturing the carbon commutator 101. Instead of the process of sintering of the annular green compact 129 to obtain the annular sintered compact 130, a green compact of a solid disc shape may be sintered to obtain a sintered compact of a solid disc shape, a passage hole may be made in its center, and the sintered compact may be divided into sectorial segments 103.

In the carbon commutator 101 of the embodiment, the ends 104c of the riser pieces 104 vertically protrude from the rear surfaces 103d of the segments 103 and are embedded into the top surfaces 102a of the boss member 102, thus ensuring a sufficient enough strength of the bonding of the boss member 102 to the segments 103. The ends 4c may be bent at an angle toward the outer circumference before pressing the boss member 102, and this may increase the bonding strength. Without the protruding ends 104c of the riser pieces 104, or in addition to the above construction, grooves may be formed on the curved surfaces of the inside and outside circumferences of the segments 103 or chamfers may be made at corners between these irregularly curved surfaces and the top surfaces 103a of the segments 103, and the boss member 102 may thereafter be formed by pressing resin, so that the resin covers the grooves and the chamfers to engage the segments 103 with the boss member 102, thereby increasing the bonding strength.

While in the carbon commutator 101 of the embodiment each of the carbon layer 110 and the metal layer 111 in the segment 103 has approximately ½ of the thickness of that of the segment 103, the metal layer 111 may be formed only around the riser piece 104, an intermediate layer may be formed between the carbon layer 110 and the metal layer 111, and the ratio of the copper and tin components to the carbon component may be increased from the carbon layer 110 toward the metal layer 111. Although in the embodiment the carbon commutator of the present invention used in the intank type fuel feed pump is explained, the invention is not limited to this embodiment and may be applied to other types of motor. The present invention, in which carbon commutator 101 is flattened in the embodiment, may be applied to other general column-shaped commutators.

Third Embodiment

Figure 20:
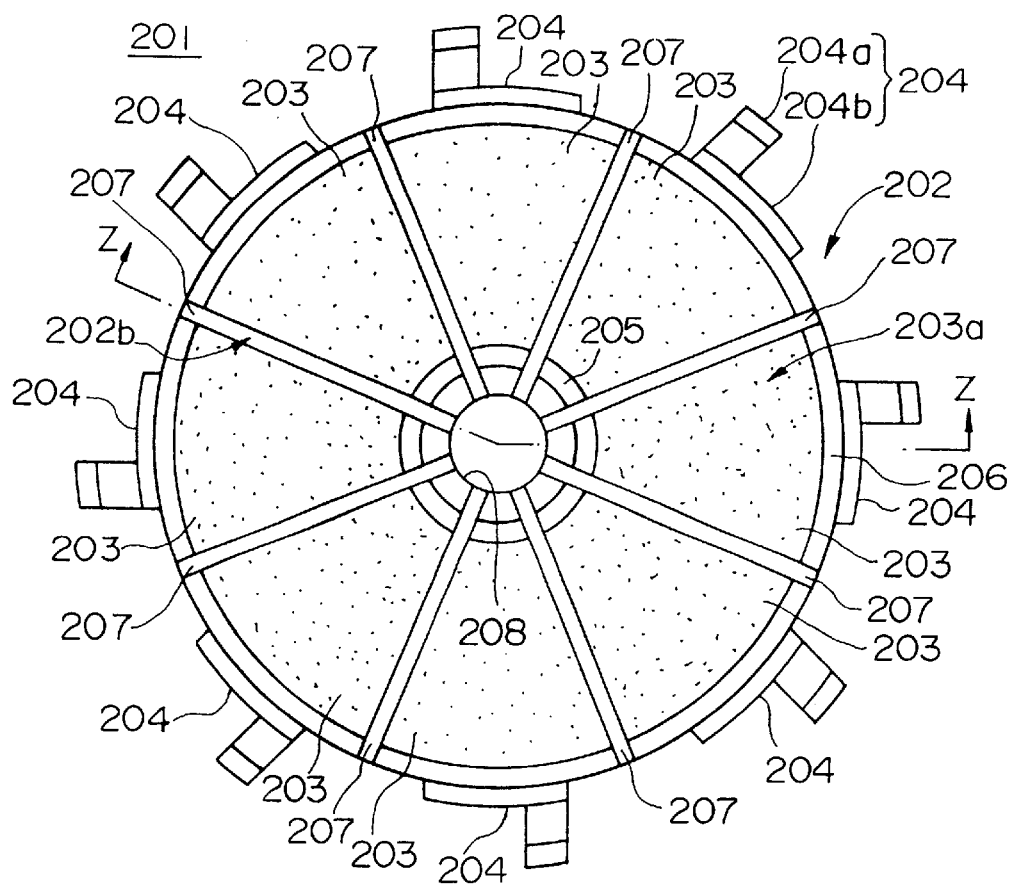
FIG. 20 is a top view showing a side of top surfaces 203a of segments 203 of carbon commutator 201 according to an embodiment of the present invention.
Figure 21:
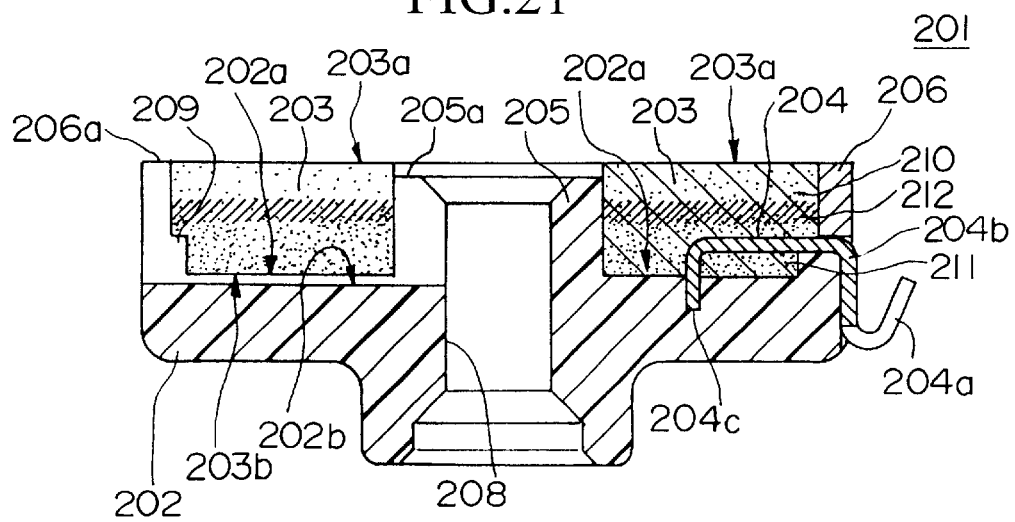
FIG. 21 is a cross-sectional view from line Z—Z of FIG. 20.

FIGS. 20 and 21 show one embodiment of a carbon commutator according to the present invention. The carbon commutator 201 of the invention, which is applied to, for example, a motor in an in-tank type fuel feed pump, is flattened, and comprises a nearly disc-shaped boss member 202 made of insulating resin, and a plurality of segments 203 (eight segments in this embodiment) which are located at regular intervals in a circumferential direction, forming an annular shape on a circular top surface 202a of the boss member 202. Top surfaces 203a of the segments 203 are sliding members in contact with a brush of a motor. Further, each segment 203 has a riser piece 204 which is a conductive terminal member, and one end 204a of the riser piece 204 projects outward from the boss member 202.

On the top surface 202a of the boss member 202, a cylindrical inside wall 205 is built at the center and a cylindrical outside wall 206 is built at the periphery, while the top surfaces 203a of the segments 203 are shaped into sectorial blocks as shown in FIG. 20. The segments 203 are located so that inner and outer circumference surfaces are in contact with the inside and outside walls 205 and 206, forming a radial shape with the center at the inside wall 205, and are arranged in a circumferential direction on the boss member 202 as described above. Between the neighboring segments 203, slits 207 extend in radial directions on the boss member 202 to form grooves 202b indented by one step from the top surface 202a through the inside wall 205 and the outside wall 206, insulating the neighboring segments 203 from each other. An axis hole 208 in the inside wall 205 reaches the other surface of the boss member 202, and is used to mount the carbon commutator 201 to the rotation axis of the motor. A top surface 205a of the inside wall 205 is lower than the top surfaces 203a of the segments 203, while the top surface 206a of the outside wall 206 corresponds to the top surfaces 203a. A step 209 is shaped on corners between the top surface 202a of the boss member 202 and an inside surface of the outside wall 206.

The riser pieces 204, which are conductive terminal members in this embodiment, are formed into plate-shapes of copper or copper alloy, and are embedded above rear surfaces 203d of the segments 203 raised slightly towards the top surfaces 203a, as shown in FIG. 21. The riser pieces 204 extend outward in the radial direction of the boss member 202 from nearly the middle of the segment 203 through the outside wall 206, are bent at the rear portion to form L-shapes, and extend via wide portions 204b along the outside circumference of the outside wall 206 to ends 204a. The ends 204a are formed into V-shapes by bending projections, which extend outward, toward the front side. The other ends 204c of the riser pieces 204 project from the rear surfaces 203b of the segments 203 and are embedded vertically in top surface 202a of the boss member 202.

In the embodiment of the carbon commutator 201, portions including the top surfaces 203a, which are sliding members of the segments 203, are carbon layers 210 in which carbon and appropriate binder are mixed. Portions including the rear surfaces 203b around the riser pieces 204 are metal layers 211 of copper and material which can alloy with the riser pieces 204 of the conductive terminal member and have a melting point lower than that of the riser pieces 204, for example, tin. Intermediate layers 212 comprising carbon and copper are located between the carbon layers 210 and the metal layers 211. In the metal layers 211, an alloy of copper and tin, that is bronze, is deposited due to liquid phase sintering of copper and tin, and this alloy affects the riser pieces 204 of copper or copper alloy, thus integrating the riser pieces 204 with the carbon layers 210 and the metal layers 211, that is, the segments 203. The weight ratio of copper to tin in the metal layers 211 is in a range from 98.0:2.0 to 86.5:13.5, and preferably in a range of 95.0:5.0 to 90.0:10.0, and in this embodiment, it is set to 90.0:10.0. The percentage content by weight of the carbon in the intermediate layer 212 is in a range of 10 to 40 wt %, and in the embodiment it is set to 20 wt % to set a volume ratio of the carbon to the copper approximately to 1:1. In addition, at least one material selected from the group of zinc, antimony, and lead may be substituted for all or a part of the tin in the metal layer 211.

Figure 22A:
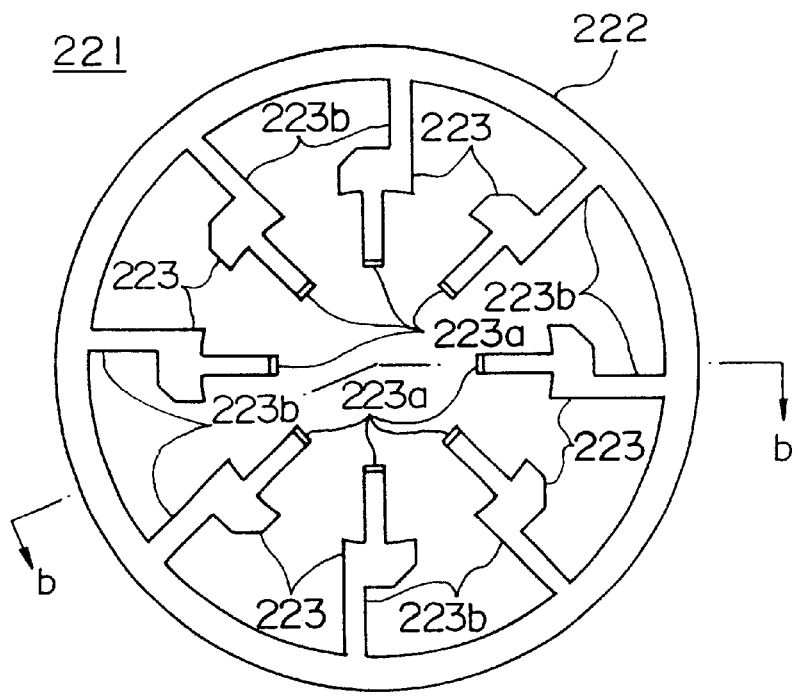
FIG. 22(a) is a top view showing a riser piece element plate 221 obtained by a method for producing the carbon commutator 201 according to the embodiment of the present invention.
Figure 22B:
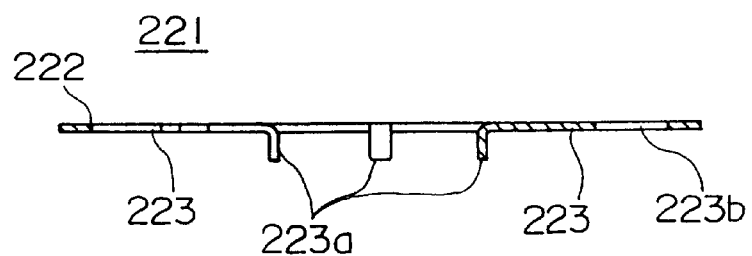
FIG. 22(b) is a cross-sectional view from line b—b of FIG. 22(a).

Referring to FIGS. 22 to 26, a method for producing the carbon commutator 201 described above according to the embodiment of the present invention will be explained. Before manufacturing the carbon commutator 201, a riser piece element plate 221, which is a prototype of the riser pieces 204 to be integrated with the segments 203 shown in FIG. 22, is prepared. The riser piece element plate 221 of circular outline is a copper plate or a copper alloy plate, and in this embodiment, is manufactured by pressing of an oxygen-free copper plate of 0.6 mm in thickness. The riser piece element plate 221 have an annular ring-shaped member 222 with an inner diameter greater than an outside diameter of the produced carbon commutator 201, and riser piece elements 223 of the same number of the riser pieces 204 are integrally formed at the inner rim of the ring-shaped member 222. The riser piece element plate 221 have the shape of unbent riser pieces 204 excluding the inner ends 223a as the above described other ends 204c of the riser pieces 204 which are bent beforehand, and extend in radial directions in a fashion similar to the riser pieces 204 in the segments 203 located in the circumferential direction in the finished carbon commutator 201. Outer ends 223b corresponding to the ends 204a of the riser pieces 204 are integrally connected to the ring-shaped member 222.

Figure 23A:
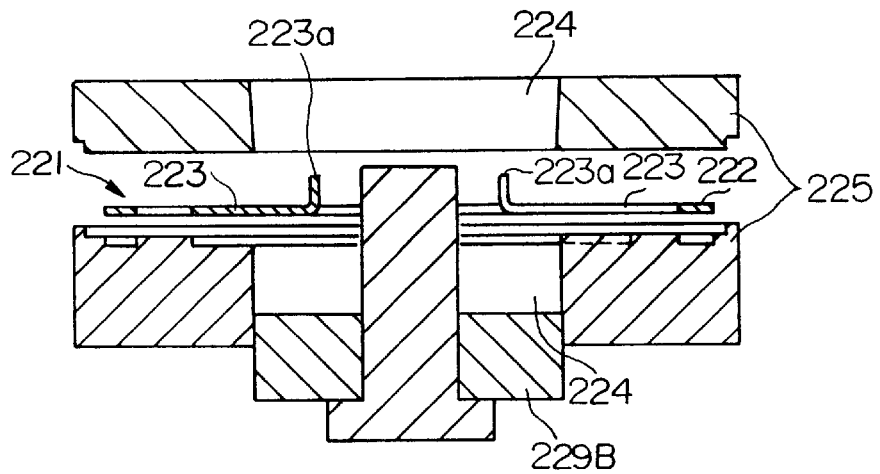
FIGS. 23(a) to 23(c) are cross-sectional views of a green compact mold 225 used in the method for producing the carbon commutator 201 according to the embodiment of the present invention.
Figure 23B:
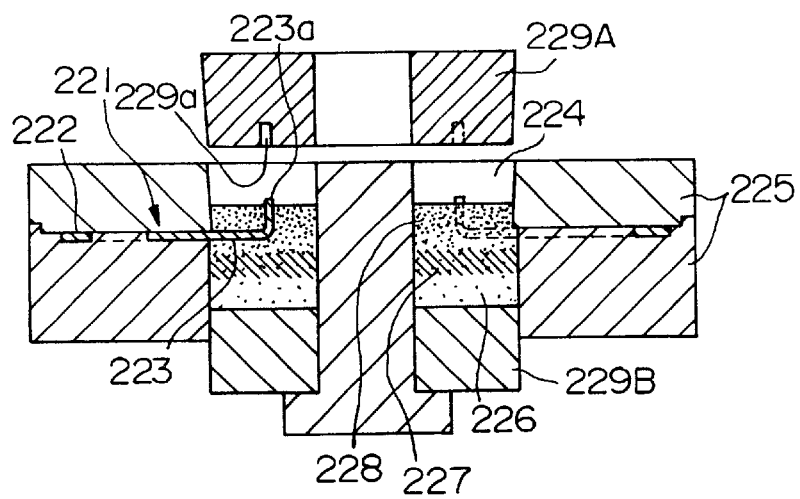

As shown in FIG. 23(a), the riser piece element plate 221 is placed on a green compact mold 225 with an annular cavity 224 whose dimensions are set in view of contraction in size in sintering with respect to the dimensions of the segments 203. The riser piece element plate 221 is placed such that the axes of the riser piece element plate 221 and the cavity 224 are aligned. As shown in FIG. 23(b), a mixed powder comprising the carbon powder and the binder is fed into the cavity 224 to form a carbon powder layer 226 on a side corresponding to the top surfaces 203a of the segments 203 (the bottom of the cavity 224). Subsequently, a mixed powder comprising carbon and copper is fed onto the carbon powder layer 226 to form a first mixed powder layer 227. Subsequently, a mixed powder comprising copper and tin is fed in to form a second mixed powder layer 228 in a side corresponding to the rear surfaces 203d around the riser piece elements 223 of the riser piece element plate 221.

In the embodiment, the mixed powder of the carbon powder layer 226 is produced by mixing the mixed carbon powder comprising natural and artificial graphite with a phenol binder, subsequently kneading, drying, grinding, and grading the powder by size, and regulating the grain size to less than 500 μm. The mixed powder of the second mixed powder layer 228 is produced by blending an electrolytic copper powder and a pulverized tin powder at a predetermined weight ratio and mixing the powders using a V-type mixer. The mixed powder of the first mixed powder layer 227 is produced by blending the mixed carbon powder comprising the carbon powder and the binder forming the carbon powder layer 226 and the electrolytic copper powder forming the second mixed powder layer 228 so that the percentage content of the carbon becomes the above-mentioned predetermined value.

Preferably, when forming the carbon layer 226, the first mixed powder layer 227, and the second mixed powder layer 228, the carbon powder layer 226 is formed by filling the bottom side of the cavity 224 with the mixed powder comprising the carbon powder and the binder, subsequently the carbon powder layer 226 is made uniform in thickness by slightly pressing the carbon powder layer 226 using a temporary press template. Subsequently, the first mixed powder layer 227 is thereafter formed by feeding the mixed powder comprising the carbon and the copper on the carbon powder layer 226, and the first mixed powder layer 227 is made uniform in thickness by slightly pressing the first mixed powder layer 227 using a temporary press template. Subsequently, the second mixed powder layer 228 is formed by feeding the mixed powder of copper and tin on the first mixed powder layer 227.

Figure 23C:
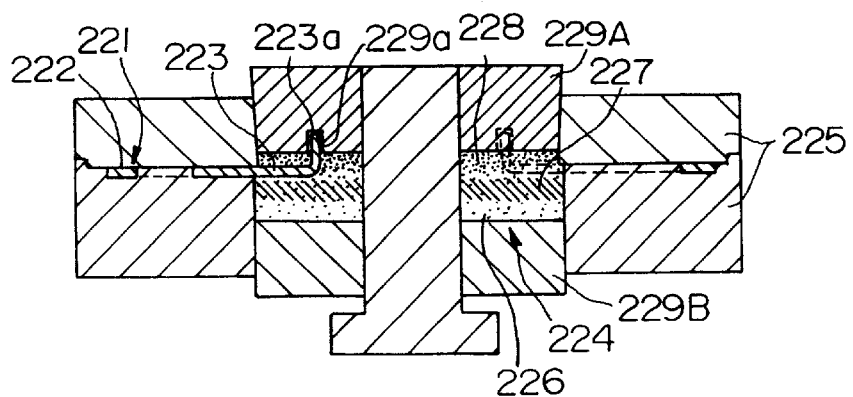
Figure 24:
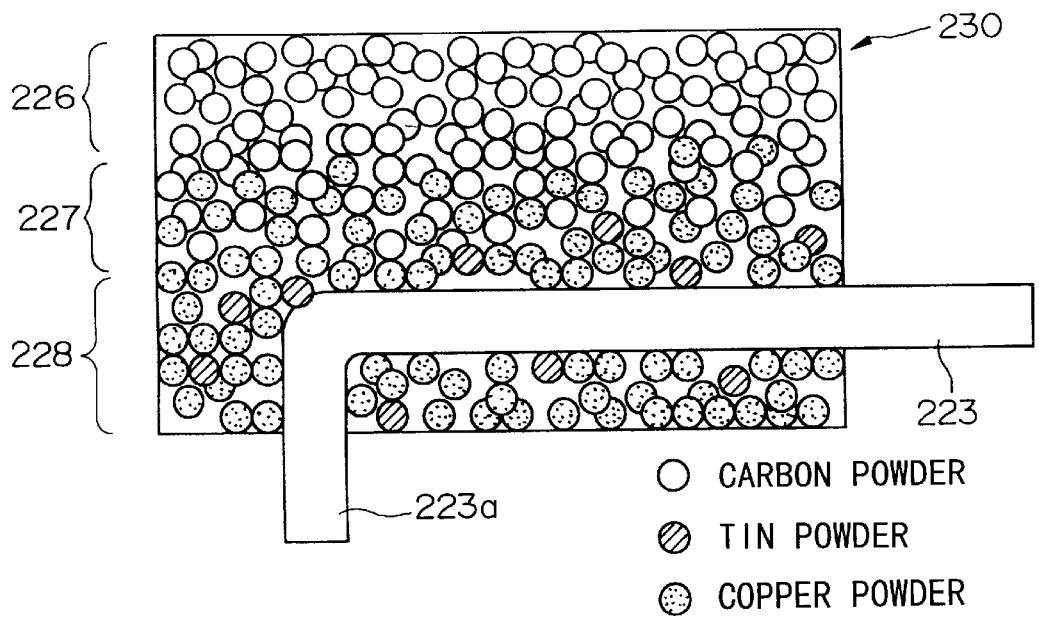
FIG. 24 is a schematic cross-sectional view of a green compact 230 in the method for producing the carbon commutator 201 according to the embodiment of the present invention.

The carbon powder layer 226, the first mixed powder layer 227, and the second mixed powder layer 228 in the cavity 224 are compressed and molded together with the riser piece element plate 221 by pressure hardening templates 228A and 228B at a comparatively high compacting s of around 3 t/cm$^2$ using an oil hydraulic press as shown in FIG. 23(c), so that an annular green compact (compressed powder compact) 230 including three layers, which are the carbon powder layer 226, the first mixed powder layer 227, and the second mixed powder layer 228, is formed as shown in FIG. 24. In the powder compacting, the bent inner ends 223a of the riser piece elements 223 protrude from the second mixed powder layer 228 so as to be accommodated in recesses 229a on the pressure hardening template 229A. Then, the molded green compact 230 is removed together with the riser piece elements 221 from the green compact mold 225.

Figure 25:
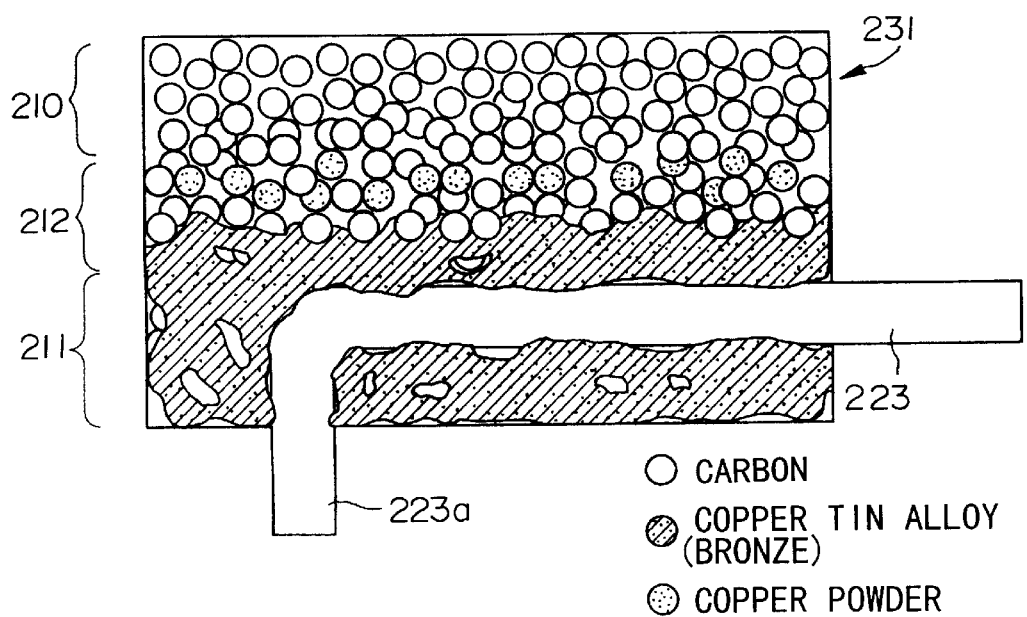
FIG. 25 is a schematic cross-sectional view of a sintered compact 231 in the method for producing the carbon commutator 201 according to the embodiment of the present invention.
Figure 26A:
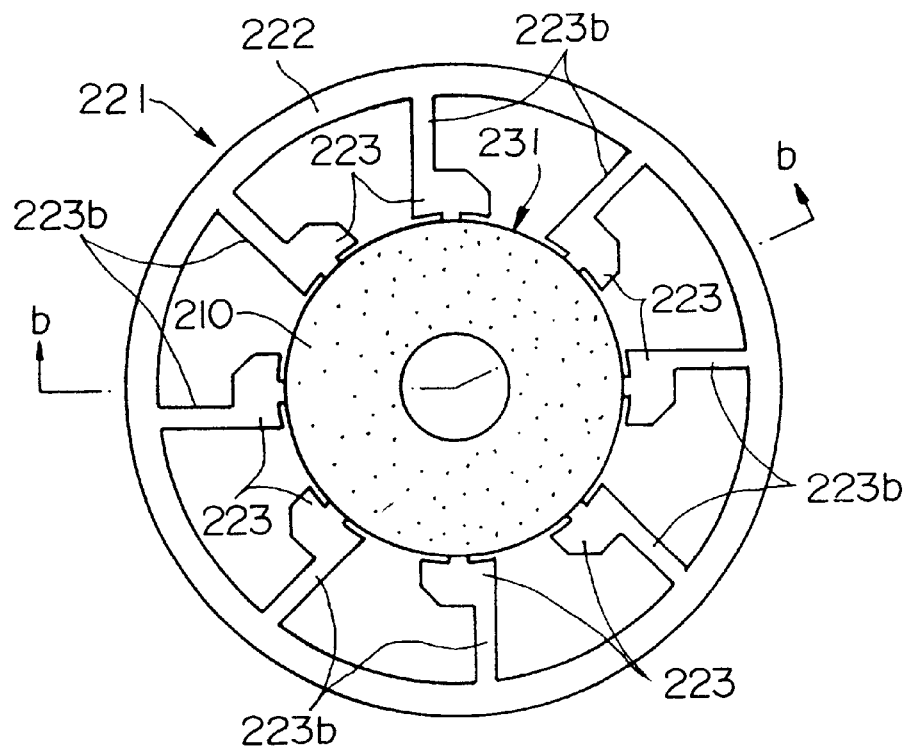
FIG. 26(a) is a top view showing the sintered compact 231 to which the riser piece element plate 221 is connected.
Figure 26B:
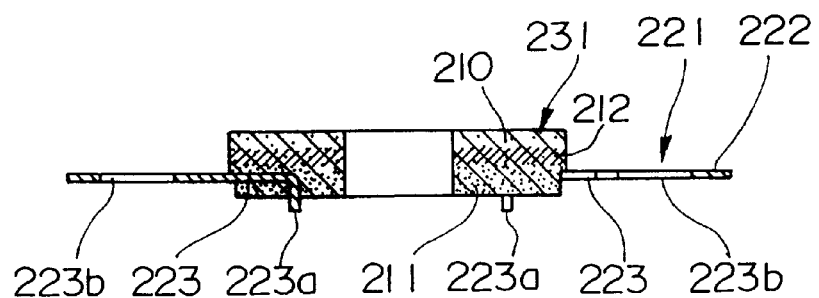
FIG. 26(b) is a cross-sectional view from line b—b of FIG. 26(a).

Next, the green compact 230 is charged and baked in a sintering furnace, so that an annular sintered compact 231 of a prototype of the segments 203 is obtained as shown in FIGS. 25 and 26. The carbon powder in the carbon powder layer 226 is bound with the binder so that the carbon layer 210 is formed, while in the first mixed powder layer 227 the copper mixed with the carbon powder is bound to form the intermediate layer 212 as the carbon powder is bound with the binder. Liquid phase sintering occurs in the second mixed powder layer 228 so that surfaces of the riser piece elements 223 are alloyed with the copper powder and the tin powder, thus forming the metal layer 211 integrally combined with the riser piece elements 223.

In the sintering of the green compact 230, the carbon powder in the carbon powder layer 226 and the carbon powder in the first mixed powder layer 227 are bound together by the binder, so that the carbon layer 210 and the intermediate layer 212 are integrally sintered. The liquid phase sintering of the tin powder and the copper powder in the second mixed powder layer 228 affects the copper powder in the first mixed powder layer 227, so that the metal layer 211 and the intermediate layer 212 are integrally sintered. The carbon layer 210 around the top surface 203a, which is the sliding member of the segment 203, the intermediate layer 212, and the metal layer 211 around the rear surfaces 203d are electrically and mechanically combined with the riser piece element 223 which is the riser piece 204. Preferably, the temperature at which the green compact 230 is sintered to produce the sintered compact 231 is set in a range of 800 to 850° C., and in this embodiment, the temperature is set to approximately 825° C.

Subsequently, the boss member 202 is integrally formed by pressing (molding) using insulating resin. In the sintered compact 231 shown in FIG. 26, the ends of the riser piece elements 223 (the ends 204a and the wide portions 204b of the riser pieces 204) protrude from the circumference of the annular sintered compact 231. The ring-shaped member 222 is still integrally connected around the circumference. The inner ends 223a of the riser piece elements 223 protrude from surfaces of the metal layer 211 corresponding to the rear surface 203d of the segment 203. The sintered compact 231 is accommodated in a mold which has a circular cavity with a diameter greater than the diameter of the sintered compact 231 by the thickness of the outside wall 206 of the boss member 202 and in which a column corresponding to the position of the axis hole 208 is built. The surface of the metal layer 211 faces the cavity and the axes of the sintered compact 231 and the cavity are aligned. Subsequently, molten resin is fed into the cavity, and pressing and cooling are carried out. Thus, the boss member 202, which has the inside wall 205, the outside wall 206, and the axis hole 208, and in which the inner ends 223 of the riser piece elements 223 are embedded into the top surface 202a, is integrally formed with the sintered compact 231.

After the boss member 202 is integrally formed with the sintered compact 231, the riser piece element plate 221 is still attached around the circumference of the boss member 202. The connections between the outer ends 223b of the riser piece elements 223 of the riser piece element plate 221 and the ring-shaped member 222 are cut down to separate the riser piece elements 223. The wide portions 204b are bent toward the rear and are curved along the circumference of the outside wall 206, and the outer ends 223b are bent so as to have a V-shape, forming the riser pieces 204 into the above-described shapes. Between neighboring riser pieces 204, the slits 207 have a depth formed by cutting completely through the sintered compact 231 and slightly into the top surface 202a of the boss member 202, so as to extend in radial directions of the annular sintered compact 231 from the circumference of the outside wall 206 to the axis hole 208. The sintered compact 231 is thus divided into sectorial blocks of the segments 203, which are insulated from each other, at which point the carbon commutator 201 is completed.

In the manufactured carbon commutator 201, because the top surfaces 203a corresponding to sliding members on the brush contain the carbon layers 210, erosion of the segments 203 and deterioration of the fuel can be prevented even in the motor in the in-tank type fuel feed pump for fuel which contains a large portion of alcohol. On the other hand, the metal layer 211 around the riser piece 204, which is the conductive terminal member is produced by sintering copper and tin, and alloys with the riser pieces 204 through liquid phase sintering. The intermediate layer 212 comprising carbon and copper is formed between the metal layer 211 and the carbon layer 210. The carbon in the intermediate layer 212 is bound with the carbon layer 210, and the liquid phase sintering in the metal layer 211 affects the copper in the intermediate layer 212, thereby integrating the carbon layer 210 and the metal layer 211 through the intermediate layer 212, and the sintered segments 203 can be more reliably and firmly integrated with the riser pieces 204.

By the liquid phase sintering of the metal layer 211, the particles are rearranged in the dissolution and re-deposition process, so that compressive stress due to thermal expansion in the riser pieces 204 (riser piece elements 223) can be relaxed, and gaps around the riser piece elements 223 are filled with the liquid phase irrespective of thermal expansion and contraction in the riser piece elements 223. Even when thermal stress occurs between the carbon layer 210 and the metal layer 211 because of a difference in expansion and contraction therebetween during the sintering of the green compact 230, the intermediate layer 212 relaxes the thermal stress, thereby preventing the bonding of the carbon layer 210 to the intermediate layer 212 and the bonding of the intermediate layer 212 to the metal layer 211 from being separated. Especially, this is effective when the sintering temperature is 850 to 900° C. According to the carbon commutator 201 with the above construction, even when the sintering temperature is high, irregularity in electrical resistance values between the segments 203 and contact failure between the segments 203 and the riser pieces 204 due to incomplete bonding can be prevented. Even in a fuel including alcohol mentioned above, superior stability and performance on a long-term basis can be obtained.

Figure 27:
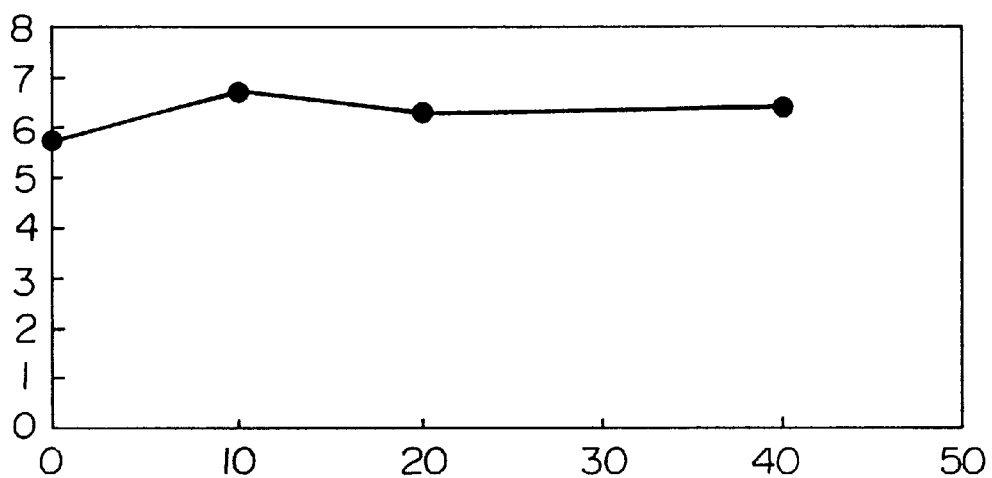
FIG. 27 is a graph showing a relationship between a percentage content of carbon in an intermediate layer 212, and a peel strength between the intermediate layer 212, a carbon layer 210, and a metal layer 211.
Figure 28:
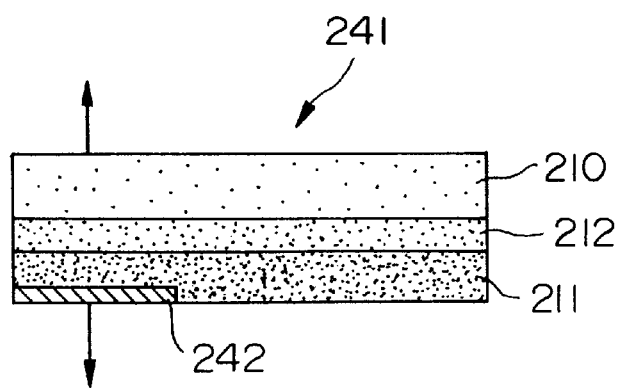
FIG. 28 is a cross-sectional view of a test piece 231 used in the measurement of the relationship shown in FIG. 27.

While in the embodiment the percentage content in weight of the carbon contained in the intermediate layer 212 is in a range of 10 to 40 wt %, when the percentage content of the carbon in the intermediate layer 212 is too low, the carbon in the intermediate layer 212 which is bound with the carbon layer 210 during the sintering decreases, and this makes the carbon layer 210 and the intermediate layer 212 separate easily. When the percentage content of the carbon in the intermediate layer 212 is too high and the percentage content of the copper is low, the copper which is liquid-phase-sintered with the metal layer 211 decreases, this makes the metal layer 211 and the intermediate layer 212 separate easily. FIG. 27 shows the tensile load (peel strength) at which point separation occurs between the carbon layer 210 and the intermediate layer 212 or between the metal layer 211 and the intermediate layer 212 in a test piece 241 shown in FIG. 28, which is pulled in the direction indicated by the arrow in the FIG. 28, as the weight ratio of the carbon component in the metal layer 211 varies. Herein, reference numeral 242 in the test piece 241 denotes a copper plate, which corresponds to the riser piece.

As shown in FIG. 27, when the percentage content of the carbon component in the intermediate layer 212 is in a range of 10 to 40 wt %, the peel strength increases. When the percentage content of the carbon is less than 10 wt %, the peel strength increases as the percentage content of the carbon increases, whereas when the percentage content of the carbon is more than 10 wt %, the peel strength gradually decreases as the percentage content of the carbon increases. When the percentage content of the carbon is low, the test piece 241 is separated between the carbon layer 210 and the intermediate layer 212, whereas when the percentage content of the carbon is increased, the test piece 241 is separated between the metal layer 211 and the intermediate layer 212. As is obvious from the result of the FIG. 27, the percentage content of the carbon in the intermediate layer 212 preferably is in a range of 10 to 40 wt % as shown in the embodiment.

While in the embodiment the weight ratio of the copper to the tin in the metal layer 211 is set to 90:10, when the tin component in the weight ratio is too high, a brittle phase of the intermetallic compound of copper and tin may form in the metal layer 211 during the sintering, and this may inhibit secure bonding of the segments 203 and the riser pieces 204. Further, it is undesirable that depending on the sintering temperature the concentration of tin component in the metal layer 11 may exceed the upper limit of the concentration of tin in a stable α solid solution in the copper tin alloy series. On the other hand, when the tin component ratio is too low, the molten tin alloys preferentially with the copper powder particles, which have small diameters and are apt to alloy, thereby reducing the ratio of the material which alloys with the riser pieces 223. This is undesirable because secure bonding of the segments 203 and the riser pieces 4 may be inhibited. When he sufficient peel strength is given between the segment 203 and the riser piece 204 in the carbon commutator 201, and when the upper limit of the tin component concentration in the stable α solid solution around 800° C., where the liquid phase sintering occurs, is 13.5 wt %, the weight ratio of the copper to the tin in the metal layer 211 is preferably set in a range of 98.0:2.0 to 86.5:13.5, and more preferably in a range of 95.0:5.0 to 90.0:10.0.

In the method for producing the carbon commutator 201, the carbon powder layer 226 of the carbon powder, the first mixed powder layer 227 of the mixed powder comprising carbon and copper, and the second mixed powder layer 228 of the mixed powder comprising copper and tin, which are layered together, are pressed to form the green compact 230 with the riser piece element plate 221, the green compact 230 is sintered at 825° C. to produce the sintered compact 231, and the segments 203 are thereafter formed. When the sintering temperature is too low, the phase liquid sintering is not sufficiently promoted, thus inhibiting the secure bonding of the segments 203 with the riser pieces 204. When the sintering temperature is too high, the copper component melting into the phase of the molten tin is increased, and may flow out along the riser piece elements 223 in the sintering process, and the shape of the sintered compact 231 may not be maintained. To avoid this, the sintering temperature is preferably set in a range of 800° C. to 850° C. as described above when the green compact 230 including the carbon powder layer 226, the first mixed powder layer 227, and the second mixed powder layer 228 is sintered to provide the segments 203.

Since in the carbon commutator 201 in the embodiment the intermediate layer 212 relaxes the thermal compressive stress between the carbon layer 210 and the metal layer 211 during the sintering, the sintered compact 231 can be obtained through the sintering of the green compact 230 at the high temperature of 850 to 900° C. by adjusting the compounding ratio of the carbon to the copper (the percentage content of the carbon) in the second mixed powder layer 228 such that the shape of the sintered compact 231 is reliably maintained. In the sintered compact 231 produced at the high temperature, the liquid phase sintering in the metal layer 211 is promoted, so that the bonding against the riser piece 204 (riser piece element 223) can be improved. In addition to the above effect, because of the improvement of the bonding of the intermediate layer 212, the carbon layer 210, and the metal layer 211 and of the relaxation of the thermal compressive stress through the intermediate layer 212 described above, the peel strength can be further enhanced. As the green compact 230 in the embodiment is compared with a green compact in which a carbon layer 226 and a second mixed powder layer 228, having the same compositions as the embodiment, are directly layered without a first mixed powder layer 227 and which is sintered at 850° C. under the condition described above, the peel strength of the latter green compact is 6.6 kgf while the peel strength of the green compact 230 is 15.7 kgf, which has been considerably improved.

Preferably, when forming the green compact 230, one of the carbon powder layer 226 and the second mixed powder layer 228 (the carbon powder layer 226 in this embodiment) is formed in the mold 225, and is temporarily pressed to regulate its thickness, subsequently the first mixed powder layer 227 is formed thereon and is pressed to regulate its thickness, and subsequently the other of the carbon powder layer 226 and the second mixed powder layer 228 (the mixed powder layer 228 in this embodiment) is formed and pressed. The processes regulates the thickness of the carbon layer 210 and the metal layer 211 in the sintered segment 203. For example, even when friction occurs on the top surfaces 203a of the segments 203 which are the sliding members on the brush, the metal layers 211 can be prevented from being partly exposed because of the irregular thickness of the carbon layers 210, and this prevents shortening of the life of the carbon commutator 201 due to the exposure of the metal layer 211. In addition, when the carbon powder layer 226 is earlier formed and is temporarily pressed to regulate the thickness, the sintered carbon layer 210 is therefore made uniform in thickness, so the temporary pressing for the first mixed powder layer 227 may be omitted.

While in the embodiment the carbon powder layer 226 is formed and is temporarily pressed, and the first mixed powder layer 227 and the second mixed powder layer 228 are thereafter formed, the riser piece element plate 221 may be positioned near the bottom of the compacting mold 225, copper and tin powders may be fed in to form the second mixed powder layer 228 and may be temporarily pressed to regulate its thickness, subsequently carbon and copper powders may be fed in to form the first mixed powder layer 227, and subsequently a carbon powder may be fed in to form the carbon powder layer 226. While in the embodiment the second mixed powder layer 228 corresponding to the metal powder layer 228 is formed around the riser piece elements 223, the metal powder layers 211 may be formed such that the second mixed powder layer 228 may be formed on the surface of the riser piece elements 223 only on the side of the carbon powder layer 226, thus advantageously making the segments 203 thinner.

In the method of the embodiment according to the present invention, the annular green compact 230 is compressed and sintered together with the riser piece element plate 221 to which the riser piece elements 223 are connected, the boss member 202 of the insulating resin is formed by pressing on the annular sintered compact 231, and the segments 203 are formed by cutting the slits 207 so that the segments 203 are insulated from each other. Alternatively, sectorial blocks of green compacts 230 may be shaped and sintered together with separated riser piece elements 223, the boss member 202 may be formed by pressing of an insulating resin onto the sintered segments 203 arranged in a circumferential direction at intervals, and these segments 203 may be integrated, thus completing manufacturing the carbon commutator 201. Instead of the process of sintering of the annular green compact 230 to obtain the annular sintered compact 231, a green compact of a solid disc shape may be sintered to obtain a sintered compact of a solid disc shape, a passage hole may be made in its center, and the sintered compact may be divided into sectorial segments 203.

In the carbon commutator 201 of the embodiment, the ends 204c of the riser pieces 204 vertically protrude from the rear surfaces 203d of the segments 203 and are embedded into the top surfaces 202a of the boss member 202, thus ensuring a sufficient enough strength of the bonding of the boss member 202 to the segments 203. The ends 204c may be bent at an angle toward the outer circumference before pressing the boss member 202, and this may increase the bonding strength. Without the protruding ends 204c of the riser pieces 204, or in addition to the above construction, grooves may be formed on the curved surfaces of the inside and outside circumferences of the segments 203 or chamfers may be made at corners between these irregularly curved surfaces and the top surfaces 203a of the segments 203, and the boss member 202 may thereafter be formed by pressing resin, so that the resin covers the grooves and the chamfers to engage the segments 203 with the boss member 203, thereby increasing the bonding strength.

While in the carbon commutator 201 of the embodiment the percentage content of the carbon is uniform through the intermediate layer 212, the percentage content of the carbon in the intermediate layer 212 may be by degrees increased from the metal layer 211 toward the carbon layer 210, or the intermediate layer 212 may contains a plurality of layers in which the percentage content of the carbon may be gradually increased from the metal layer 211 toward the carbon layer 210. This improves the bonding between the carbon during the sintering in the intermediate layer 212 on the side of the carbon layer 210 where the percentage content of the carbon is high, and the integration between the carbon layer 210, the metal layer 211, and the intermediate layer 212 becomes secure in the intermediate layer 212 on the side of the metal layer 211 where the percentage content of the copper is high, because the liquid phase occurring in the metal layer 211 is broadly diffused into the intermediate layer 212. Although in the embodiment the carbon commutator of the present invention used in the in-tank type fuel feed pump is explained, the invention is not limited to this embodiment and may be applied to other types of motor. The present invention, in which carbon commutator 201 is flattened in the embodiment, may be applied to other general column-shaped commutators.

Industrial Applicability

According to the present invention, because a sliding member of a segment is formed by a carbon layer, erosion in the segment can be prevented even in gasoline which contains alcohol. A metal layer which contains copper and a material which can alloy with a conductive terminal member, for example, tin, is formed between the carbon layer and the conductive terminal member, so that the carbon layer and the conductive terminal member are reliably integrated electrically and mechanically through sintering of the metal layer in which the copper and the tin form a liquid phase. Thus, irregularity in electrical resistance values between the segments and contact failure between the segments and the conductive terminal members can be prevented, and superior stability and performance on a long-term basis can be obtained.

Further, according to the present invention, because a sliding member of a segment is formed by a carbon layer, erosion in the segment can be prevented even in gasoline which contains alcohol. A metal layer which contains carbon, copper, and a material which can alloy with a conductive terminal member, for example, tin, is formed between the carbon layer and the conductive terminal member, so that the carbon layer and the conductive terminal member are reliably integrated electrically and mechanically through sintering of the metal layer in which the copper and the tin form a liquid phase. Thus, irregularity in electrical resistance values between the segments and contact failure between the segments and the conductive terminal members can be prevented, and superior stability and performance on a long-term basis can be obtained. The metal layer contains carbon to provide an anchoring effect against the carbon layer and to relax thermal compressive stress in the metal layer arising in the sintering, making the bonding between the carbon layer, the metal layer and the conductive terminal member difficult to become separated and improves the electrical and mechanical integration. The carbon existing in the metal layer improves workability when slits are formed in the segments, and the copper and the tin stably maintain the shape of the sintered body even when the liquid phase occurs.

Moreover, according to the present invention, because a sliding member of a segment is formed by a carbon layer, erosion in the segment can be prevented even in gasoline which contains alcohol. A metal layer which contains copper and a material which can alloy with a conductive terminal member, for example, tin, is formed between the carbon layer and the conductive terminal member, so that the carbon layer and the conductive terminal member are reliably integrated electrically and mechanically through sintering of the metal layer in which the copper and the tin form a liquid phase. Thus, irregularity in electrical resistance values between the segments and contact failure between the segments and the conductive terminal members can be prevented, and superior stability and performance on a long-term basis can be obtained. Between the metal layer and the carbon layer, an intermediate layer comprising carbon and copper is formed. During the sintering, the carbon in the intermediate layer is bound with the carbon layer, while the liquid phase arising in the metal layer affects the copper in the intermediate layer, so that thermal compressive stress between the carbon layer and the metal layer can be relaxed, thus preventing separation in the segment and ensuring reliable electrical and mechanical bonding.

What is claimed is:

1. A carbon commutator segment for a motor comprising:
   a carbon layer having a sliding surface to be contacted by a brush of the motor;
   a metal layer; and
   a conductive terminal member having a principal metal component in contact with both said carbon layer and said metal layer, wherein
   said metal layer comprises a sintering of a first material comprising a first metal powder of the principal metal component of said conductive terminal member and a second metal powder of a metal which has alloyed with said principal metal component of said conductive terminal member.

2. A carbon commutator segment according to claim 1, wherein said second metal powder has a melting point lower than that of said first metal powder.

3. A carbon commutator segment according to claim 1, wherein said first material comprises copper and tin.

4. A carbon commutator segment according to claim 3, wherein a weight ratio of copper to tin in said metal layer is in a range from about 98.0:2.0 to about 86.5:13.5.

5. A carbon commutator according to claim 4, wherein a weight ratio of copper to tin in said metal layer is in a range from about 95.0:5.0 to about 90.0:10.0.

6. A method for producing a carbon commutator segment described in claim 1, wherein the method comprises:

filling a green compact mold with one of carbon to form said carbon layer and a first material comprising said first metal powder of said principal metal component of said conductive terminal member and a second metal powder which can alloy with said principal metal component of said conductive terminal member;

inserting said conductive terminal member in said mold;

filling said mold with, and then compacting, the other one of said carbon and said first material to produce a green compact; and sintering said green compact to form said segment.

7. A method for producing a carbon commutator segment according to claim 6 wherein the step of sintering is carried out at a temperature of between about 800 to about 850° C.

8. A method for producing a carbon commutator segment, in accordance with claim 6, wherein the method comprises:

filling a green compact mold with one of carbon to form said carbon layer and a first material comprising a first metal powder of a principal metal component of said conductive metal terminal member and a second metal powder which can alloy with said principal metal component of said conductive metal terminal member to form a metal layer, and then compacting the material in the mold;

filling said mold with and then compacting the other one of said carbon and said first material to produce a green compact; and sintering said green compact to form said segment.

9. A carbon commutator segment according to claim 1, wherein a surface of said conductive terminal member is alloyed with said metal layer by a second material which is sintered, said second material comprising a carbon powder, a first metal powder of a principal metal component of said conductive terminal member, and a second metal powder alloyed with said principal metal component of said conductive terminal member.

10. A carbon commutator segment according to claim 9, wherein in said second material said second metal powder has a melting point lower than that of said first metal powder.

11. A carbon commutator segment according to claim 9, wherein said second material comprises carbon, copper and tin.

12. A carbon commutator segment according to claim 9, wherein a percentage content of said carbon in said second material is in a range of from about 2 to about 25 weight %.

13. A carbon commutator segment according to claim 9, wherein a percentage content of said carbon in said second material is in a range of from about 10 to about 20 weight %.

14. A carbon commutator segment according to claim 9, wherein the weight ratio of copper to tin in said metal layer is in a range of from about 98.0:2.0 to about 86.5:13.5.

15. A carbon commutator segment according to claim 9, wherein the weight ratio of copper to tin is in a range of from about 95.0:5.0 to about 90.0:10.0.

16. A method for producing a carbon commutator segment described in claim 9, wherein the method comprises:

filling a green compact mold with one of carbon to form said carbon layer and a second material comprising a carbon powder, a first metal powder of a principal metal component of said conductive metal terminal member, and a second metal powder which can alloy with said principal metal component of said conductive terminal member to form said metal layer;

compacting at least one of said carbon and said second material to produce a green compact; and sintering said green compact to form said segment.

17. A method for producing a carbon commutator segment according to claim 16, wherein the step of sintering is carried out at temperatures in the range between about 800 to about 850° C.

18. A method for producing a carbon commutator, in accordance with claim 16, wherein the method comprises:

filling a green compact mold with one of a carbon to form said carbon layer and a second material comprising a carbon powder, a first metal powder of a principal component of said conductive terminal member, and a second metal powder which can alloy with said principal component to form said metal layer, and then compacting;

filling said mold with and then compacting the other one of said carbon and said second material to produce a green compact; and sintering said green compact to form said segment.

19. A carbon commutator segment according to claim 1, further comprising an intermediate layer formed between said metal layer and said carbon layer, said intermediate layers being formed of a third material comprising a carbon powder and a first metal powder of a principal metal component of said conductive metal terminal member.

20. A carbon commutator segment according to claim 19, wherein a percentage content of said carbon in said intermediate layer is in a range of from about 10 to about 20 weight %.

21. A carbon commutator segment according to claim 19, wherein a percentage content of said carbon in said intermediate layer is increased from said metal layer to said carbon layer.

22. A method for producing a carbon commutator segment as described in claim 19, wherein the method comprises:

filling a green compact mold with one of carbon to form said carbon layer and a first material comprising a first metal powder of a principal metal component of said conductive metal terminal member and a second metal powder which can alloy with said principal component to form the metal layers;

subsequently filling a third material comprising a carbon powder and said first metal powder to form said intermediate layer;

subsequently filling said mold with and then compacting the other one of said carbon and said first material to produce a green compact; and sintering said green compact.

23. A method for producing a carbon commutator segment, in accordance with claim 22, wherein the method comprises:

filling a green compact mold with one of carbon to form said carbon layer and a first material comprising a first metal powder of a principal metal component of said conductive metal terminal member and a second metal powder which can alloy with said principal metal component of said conductive metal terminal to form the metal layer, and then compacting;

subsequently filling said third material which forms said intermediate layer, and then compacting;

subsequently filling said mold with and then compacting the other one of said carbon and said first material to produce a green compact; and sintering said green compact.

24. A carbon commutator segment as in claim 1 wherein at least one of the sintered metal powders integrates with the carbon.

* * * * *

UNITED STATES PATENT AND TRADEMARK OFFICE
CERTIFICATE OF CORRECTION

PATENT NO. : 6,222,298 B1
DATED : April 24, 2001
INVENTOR(S) : Junichi Saito and Shunji Kumagai It is certified that error appears in the above-identified patent and that said Letters Patent is hereby corrected as shown below:

<u>Title page,</u>
Item [22] PCT Filed, change "July 22, 1998" to -- July 23, 1998 --;
-- [30] Foreign Application Priority Data, change "June 8, 1997" to
-- August 6, 1997 --.

Signed and Sealed this

Eleventh Day of December, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,222,298 B1 Page 1 of 1
DATED : April 24, 2001
INVENTOR(S) : Junichi Saito and Shunji Kumagai It is certified that error appears in the above-identified patent and that said Letters Patent is hereby corrected as shown below:

<u>Title page,</u>
Item [30], Foreign Application Priority Data, change

"July 10, 1997" to -- October 7, 1997 --; and
"August 9, 1997" to -- September 8, 1997 --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,222,298 B1
DATED         : April 24, 2001
INVENTOR(S)   : Junichi Saito and Shunji Kumagai It is certified that error appears in the above-identified patent and that said Letters Patent is hereby corrected as shown below:

<u>Title page,</u>
Item [30], Foreign Application Priority Data,
"Aug. 9, 1997 (JP)……………..8-243159" should read
-- Aug. 9, 1997 (JP)…………..9-243159 --.

Signed and Sealed this

Seventh Day of October, 2003

JAMES E. ROGAN
*Director of the United States Patent and Trademark Office*